United States Patent
Sethuraman

(10) Patent No.: US 12,088,579 B2
(45) Date of Patent: Sep. 10, 2024

(54) SECURE ACCOUNT LOGIN AND AUTHENTICATION

(71) Applicant: Microsoft Technology Licensing, LLC, Redmond, WA (US)

(72) Inventor: Prabhakaran Sethuraman, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 284 days.

(21) Appl. No.: 17/536,548

(22) Filed: Nov. 29, 2021

(65) Prior Publication Data

US 2023/0171242 A1 Jun. 1, 2023

(51) Int. Cl.
*H04L 29/06* (2006.01)
*H04L 9/40* (2022.01)
*G06F 16/22* (2019.01)

(52) U.S. Cl.
CPC ........ *H04L 63/083* (2013.01); *G06F 16/2255* (2019.01)

(58) Field of Classification Search
CPC ..... H04L 63/083; H04L 9/0643; H04L 9/321; H04L 2463/082; H04L 9/3226; G06F 16/2255; G06F 21/31
See application file for complete search history.

(56) References Cited

U.S. PATENT DOCUMENTS

| | | | |
|---|---|---|---|
| 2009/0013402 A1* | 1/2009 | Plesman | H04L 9/3228 726/18 |
| 2012/0047564 A1* | 2/2012 | Liu | G06Q 20/3223 726/6 |
| 2012/0144203 A1* | 6/2012 | Albisu | G06F 21/35 713/184 |

(Continued)

FOREIGN PATENT DOCUMENTS

| | | | | |
|---|---|---|---|---|
| EP | 1919123 A1 * | 5/2008 | | G06F 21/36 |
| WO | WO-2010131218 A1 * | 11/2010 | | G06Q 20/10 |

OTHER PUBLICATIONS

"Abstract Data Type", Retrieved from: https://en.wikipedia.org/wiki/Abstract_data_type, Retrieved Date: Dec. 1, 2021, 11 Pages.

(Continued)

*Primary Examiner* — Harunur Rashid
(74) *Attorney, Agent, or Firm* — Weaver IP L.L.C.

(57) ABSTRACT

Systems, methods, and devices are described for secure account login and authentication. A set of key options including a correct key option and information indicative of a hash value are received from an authentication server. A user is prompted to select one of the set of key options. The key option selected by the user is received. A subset of PIN elements of a user-registered PIN to be input by the user is identified based on the hash value. The user is prompted to enter the subset of PIN elements. The subset of PIN elements entered by the user are received. An encoded PIN is generated based on the key option selected by the user and the (Continued)

subset of PIN elements entered by the user. The encoded PIN is transmitted to the authentication client that is configured to make an authentication decision based on the encoded PIN.

20 Claims, 11 Drawing Sheets

(56) References Cited

U.S. PATENT DOCUMENTS

| | | | |
|---|---|---|---|
| 2018/0197171 A1* | 7/2018 | Steinman | G06Q 20/385 |
| 2021/0110013 A1* | 4/2021 | Walters | G06F 21/316 |

OTHER PUBLICATIONS

"Associative Array", Retrieved from: https://en.wikipedia.org/wiki/Associative_array, Retrieved Date: Dec. 1, 2021, 7 Pages.
"Computing", Retrieved from: https://en.wikipedia.org/wiki/Computing, Retrieved Date: Dec. 1, 2021, 15 Pages.
"Data Structure", Retrieved from: https://en.wikipedia.org/wiki/Data_structure, Retrieved Date: Dec. 1, 2021, 5 Pages.
"Unique Key", Retrieved from: https://en.wikipedia.org/wiki/Unique_key, Retrieved Date: Dec. 1, 2021, 4 Pages.
"Value (Computer Science)", Retrieved from: https://en.wikipedia.org/wiki/Value_(computer_science), Retrieved Date: Dec. 1, 2021, 3 Pages.
Berndt, et al., "Using Dynamic Time Warping to find Patterns in Time Series", In Proceedings of the AAAI-94 Workshop on Knowledge Discovery in Databases, Jul. 1994, pp. 359-370.
Brachman, et al., "The Process of Knowledge Discovery in Databases: A First Sketch", In Proceedings of the AAAI-94 Workshop on Knowledge Discovery in Databases, Jul. 1994, 12 Pages.
Rajagopalan, et al., "A Fuzzy Logic Rule Based Forecasting Model: Work-Life Balance in IT Among Software vs. Services Industry on the View of Women Software Engineer", In Proceedings of the International Conference on Machine Intelligence and Research Advancement, Dec. 21, 2013, pp. 241-246.
Zadeh, L.A., "Fuzzy Algorithms", In Journal of Information and Control, vol. 12, Issue 2, Feb. 1968, pp. 94-102.
Smith, Brad, "A Moment of Reckoning: The Need for a Strong and Global Cybersecurity Response", Retrieved from: https://blogs.microsoft.com/on-the-issues/2020/12/17/cyberattacks-cybersecurity-solarwinds-fireeye/, Dec. 17, 2020, 11 Pages.
Smyth, et al., "Knowledge Discovery in Large Image Databases: Dealing with Uncertainties in Ground Truth", In Proceedings of the AAAI-94 Workshop on Knowledge Discovery in Databases, Jul. 1994, pp. 109-120.
Yuan, et al., "A High Accuracy Integrated Bagging-Fuzzy-GBDT Prediction Algorithm for Heart Disease Diagnosis", In Proceedings of the IEEE/CIC International Conference on Communications in China, Aug. 11, 2019, pp. 467-471.
Sujamol, et al., "Fuzzy Based Machine Learning: A Promising Approach", In CSI Communications, vol. 41, Issue 3, Nov. 2017, 52 Pages.
Santhosh, et al., "Generalized Fuzzy Logic based Performance Prediction in Data Mining", In Journal of Materials Today: Proceedings, vol. 45, Part 2, Jan. 1, 2021, pp. 1770-1774.
"International Search Report and Written Opinion Issued in PCT Application No. PCT/US22/041135", Mailed Date: Dec. 2, 2022, 14 Pages.

* cited by examiner

500A

502

| 1 | 6 | 11 | 16 |
|---|---|----|----|
| 12 | 15 | 2 | 5 |
| 14 | 9 | 8 | 3 |
| 7 | 4 | 13 | 10 |

504

| 30 | 1 | 12 | 7 |
|----|---|----|---|
| 11 | 8 | 29 | 2 |
| 5 | 10 | 3 | 32 |
| 4 | 31 | 6 | 9 |

506

| 36 | 22 | 23 | 33 |
|----|----|----|----|
| 25 | 31 | 30 | 28 |
| 29 | 27 | 26 | 32 |
| 24 | 34 | 35 | 21 |

| 508 | | 510 | | 512 | |
|---|---|---|---|---|---|
| Magic Square Table Index | Magic Square Values | Magic Square Table Index | Magic Square Values | Magic Square Table Index | Magic Square Values |
| 0000001 | 1, 6, 11, 16 | 0000001 | 30, 1, 12, 7 | 0000001 | 36, 22, 23, 33 |
| 0000002 | 12, 15, 2, 5 | 0000002 | 11, 8, 29, 2 | 0000002 | 25, 31, 30, 28 |
| 0000003 | 14, 9, 8, 3 | 0000003 | 5, 10, 3, 32 | 0000003 | 29, 27, 26, 32 |
| 0000004 | 7, 4, 13, 10 | 0000004 | 4, 31, 6, 9 | 0000004 | 24, 34, 35, 21 |
| 0000005 | 1, 12, 14, 7 | 0000005 | 30, 11, 5, 4 | 0000005 | 36, 25, 29, 24 |
| 0000006 | 6, 15, 9, 4 | 0000006 | 1, 8, 10, 31 | 0000006 | 22, 31, 27, 34 |
| 0000007 | 11, 2, 8, 13 | 0000007 | 12, 29, 3, 6 | 0000007 | 23, 30, 26, 35 |
| 0000008 | 16, 5, 3, 10 | 0000008 | 7, 2, 32, 9 | 0000008 | 33, 28, 32, 21 |
| 0000009 | 1, 15, 8, 10 | 0000009 | 30, 8, 3, 9 | 0000009 | 36, 31, 26, 21 |
| 0000010 | 7, 9, 2, 16 | 0000010 | 4, 10, 29, 7 | 0000010 | 24, 27, 30, 33 |

| | |
|---:|:---|
| Hash Index: | 1499194 |
| Corresponding Hash Value: | 1A3C6D24B5 |
| Masking Scheme: | 1*××6*××5 |
| Magic Square Table Index: | 0000001 |
| Key Options: | 01, 44, 52, 34, 09, 88, 37, 80, 44, 00 |

804

806

808

810

| Encoded PIN: | 2001×11AB1620×0601 |
|---:|:---|

| Rules | Key Validity | PIN Validity | | | | Calculated Risk | Impact Factor |
|---|---|---|---|---|---|---|---|
| | | 25% | 50% | 75% | 100% | | |
| Rule 1 | 1 | 1 | 0 | 0 | 0 | Very High Risk | 0.75 |
| Rule 2 | 1 | 0 | 1 | 0 | 0 | High Risk | 0.5 |
| Rule 3 | 1 | 0 | 0 | 1 | 0 | Moderate Risk | 0.25 |
| Rule 4 | 1 | 0 | 0 | 0 | 1 | Negligible/Low Risk | 0 |
| Rule 5 | 0 | 1 | 0 | 0 | 0 | Extremely High Risk | 1 |
| Rule 6 | 0 | 0 | 1 | 0 | 0 | Extremely High Risk | 1 |
| Rule 7 | 0 | 0 | 0 | 1 | 0 | Extremely High Risk | 1 |
| Rule 8 | 0 | 0 | 0 | 0 | 1 | High Risk | 0.5 |

SECURE ACCOUNT LOGIN AND AUTHENTICATION

BACKGROUND

Online services allow users to perform a wide variety of tasks by providing proper authentication. For example, users may access bank accounts, transfer funds, access personal information, purchase items, and/or the like by providing a username and password. While these types of online services provide convenience to users, they also create security concerns. For instance, unauthorized users with knowledge of another user's username and password can access the users account and information. Furthermore, malware such as spy ware and trojan programs may be used to acquire usernames and passwords.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and apparatuses are described for secure account login and authentication. A set of key options including a correct key option and information indicative of a hash value are received from an authentication server. A user is prompted to select one of the set of key options. The key option selected by the user is received. A set of N integers that sum to the key option selected by the user is identified. A subset of PIN elements of a user-registered PIN to be input by the user is identified based on the hash value. The user is prompted to enter the subset of PIN elements. The subset of PIN elements entered by the user are received. An encoded PIN is generated by combining the set of N integers with the subset of PIN elements entered by the user in an order derived from the hash value. The encoded PIN is transmitted to the authentication server that is configured to make an authentication decision based at least on comparing the encoded PIN to an expected PIN.

Further features and advantages of the embodiments, as well as the structure and operation of various embodiments, are described in detail below with reference to the accompanying drawings. It is noted that the claimed subject matter is not limited to the specific examples described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 5A depicts example magic squares corresponding to the user-registered keys shown in the example PIN mapping table of FIG. 4.

FIG. 5B depicts example magic square tables corresponding to the example magic squares shown in FIG. 5A.

FIG. 10 depicts an example set of rules that may be used to determine a risk score by an example embodiment.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
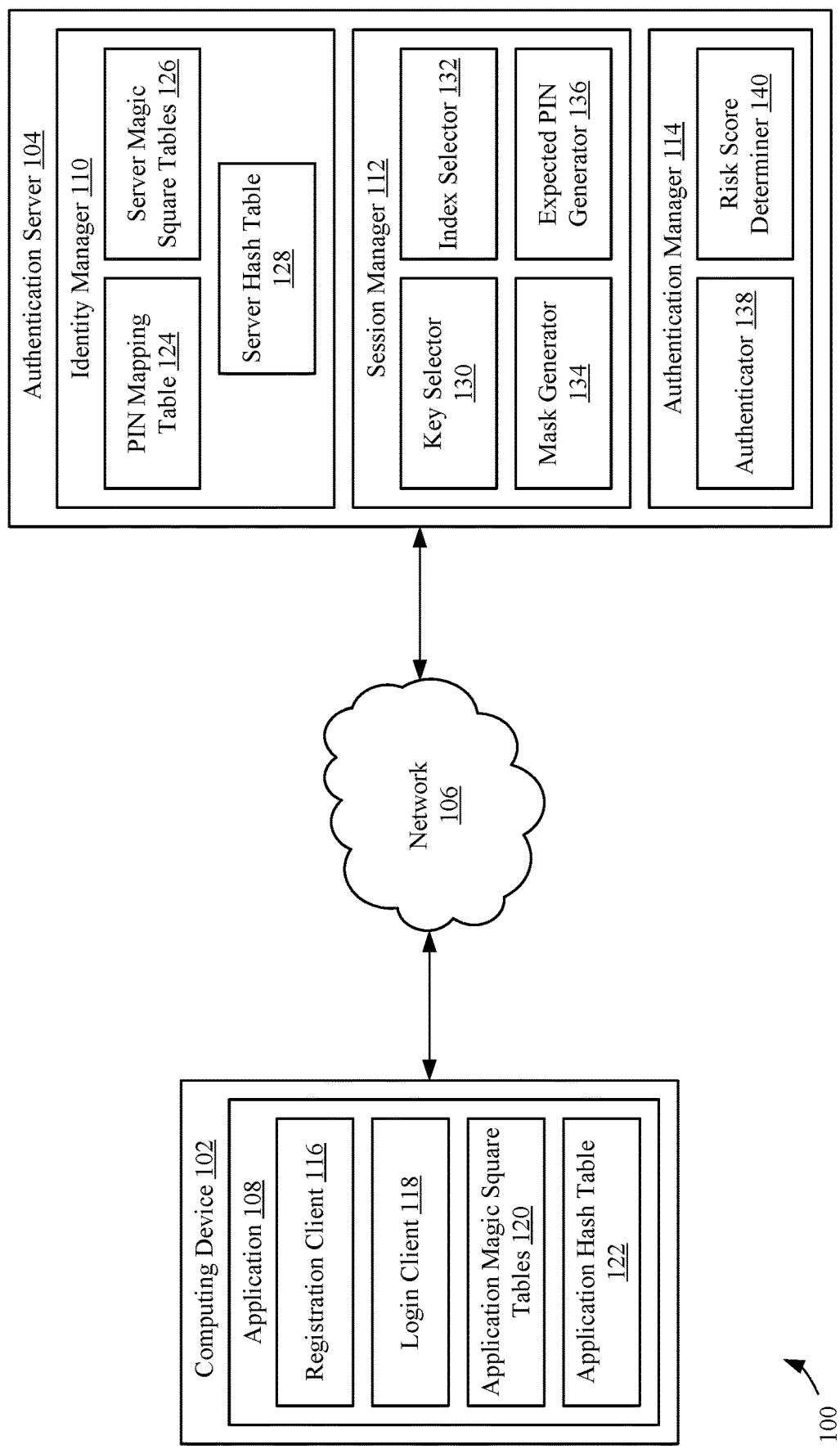
FIG. 1 is a block diagram of a system configured for secure account login and authentication, according to an example embodiment.

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

The example embodiments described herein are provided for illustrative purposes and are not limiting. The examples described herein may be adapted to any type of method or system for secure account login and authentication. Further structural and operational embodiments, including modifications/alterations, will become apparent to persons skilled in the relevant art(s) from the teachings herein.

Numerous exemplary embodiments are now described. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Secure Account Login and Authentication Embodiments

In various applications, users may perform a wide variety of tasks by providing proper authentication. For example, some online services allow users to access accounts, transfer funds, access personal information, purchase items, and/or the like by providing their username and password. While these types of online services provide convenience to users, they also create new security concerns.

Security measures are implemented to prevent unauthorized access to accounts and personal information (e.g., by hackers). For instance, one method for hackers to acquire user credentials (e.g., usernames and passwords) is capturing keystrokes on a keyboard via malware programs (e.g., spyware and trojan programs). Malware may be installed through unauthorized downloads or as an additional application of a software package. Malware captures confidential user data without the user's knowledge. These programs report the relevant information, such as internet application passwords, to the malware creator or a third party. Once a login is compromised, access may be used to erase data, overwrite data, copy data, corrupt files, encrypt files, and/or the like. Some implementations of security measures utilize anti-virus software to detect, prevent, and/or remove malware programs. However, in some cases, malware may be difficult to remove even through anti-virus software. Moreover, some malware is capable of partially or fully disabling anti-virus software.

Embodiments of the present disclosure present methods and techniques for secure account registration, login, and authentication. For example, in accordance with an embodiment, a set of keys and a personal identification number (PIN) are registered by a user. The registered set of keys and PIN are used to generate a set of key options and a pseudo-random password. The user is prompted to select a correct key option among the set of key options and provide a subset of PIN elements based on the pseudo-random password. An encoded PIN is generated based on the selected key option and the subset of PIN elements entered by the user. The encoded PIN is compared to an expected PIN to determine an authenticity of the user.

Embodiments described herein utilize pseudo-random password generation to provide secure login and authentication of a user. Such embodiments utilize user-registered information to generate a pseudo-random password. For example, a pseudo-random password may be generated based on a user-registered PIN and a set of keys. In accordance with an embodiment, a user registers the user-registered PIN and set of keys via a registration client. User-registered PINs and the set of keys will now be briefly described.

User-Registered PIN. When registering an account, a user is prompted to register a PIN with a set of number of characters. PINs may be configured to any size, depending on the particular embodiment. For instance, the registration client may request a user to register a PIN of a set size (e.g., six PIN elements), or a PIN within a range of elements (e.g., four to eight PIN elements). Each PIN element may be one or more alphabetic characters, numeric characters, alphanumeric characters, special characters (e.g., #, %, $, *, !, (,), @, etc.), and/or the like. In various implementations, a service provider associated with the registration client may determine which types of characters a PIN element may be. Depending on the implementation, each PIN element may be one or more characters. For instance, in one particular embodiment, each PIN element is two characters in length.

Set of Keys. Along with PIN registration, a user will be prompted to register a set of keys. These set of keys provide a second level of authentication in addition to the PIN. A registration client may request a user to register a certain number of, minimum number of, or maximum number of keys. In accordance with an embodiment, each key is a non-zero integer with one to three digits.

An authentication server in accordance with an embodiment generates a PIN mapping table that maps a user account to the user-registered PIN and set of keys. The PIN mapping table is stored in a database.

An authentication server in accordance with an embodiment generates a set of magic squares for each key of the set of keys registered by the user. Each magic square may comprise a 2-D array where the sum of values in a row, column, or diagonal is equivalent to the value of the key. Magic squares may be generated in various sizes, depending on the particular implementation. For instance, in one implementation each magic square is a 4-by-4 array. The authentication server may store magic squares in a variety of formats. For instance, the authentication server may generate a magic square table where each row includes a set of magic square values that represents the values of a row, column, or diagonal in a magic square associated with the key. In this context, each row may include a magic square table index for referencing the set of magic square values.

Embodiments of authentication servers may generate pseudo-random passwords in various ways. Furthermore, characters of a pseudo-random password may be ordered using various methods. In accordance with an embodiment, the order of characters of a pseudo-random password is determined by a hash value. A hash table is generated with a list of hash indexes, each associated with a hash value. Each hash value includes M numeric characters and N alphabetic characters. For example, if M is 6 and N is 4, the length of a hash value is 10 and the first hash value is "123456ABCD". In some embodiments, M is set to the number of PIN elements in the user-registered PIN and N is set to the size of the magic square. Permutations of hash values are generated by rearranging the order of the numeric and alphabetic characters. Each permutation is stored in the hash table as a hash value with an associated hash index. For instance, if M is 6 and N is 4, 3.6 million permutations are stored in the hash table.

In accordance with an embodiment, a masking scheme is used to generate a mask for a login client. The masking scheme may be determined by the authentication server, the login client, or a separate mask generating component, depending on the particular implementation. Various masking schemes may be used to generate masks in a variety of ways. For instance, a masking scheme may generate a mask based on a hash value randomly selected from the hash table.

Secure account login and authentication may be implemented in various manners, in embodiments. For example, FIG. 1 is a block diagram of a system 100 configured for secure account login and authentication, according to an example embodiment. As shown in FIG. 1, system 100 includes a computing device 102 and an authentication server 104. Computing device 102 and authentication server 104 may be communicatively coupled or linked to each other via a network 106.

Computing device 102 is configured to execute computer programs (e.g., applications or services) that interact with authentication server 104 via network 106. Such computer programs may be executed, for example, by or on behalf of users (e.g., individual users, family users, enterprise users, governmental users, etc.) or by or on behalf of other computer programs. Computing device 102 may comprise a stationary computing device or a mobile computing device. Examples of stationary computing devices include but are not limited to desktop computers, personal computers (PCs), and servers. Example of mobile computing device include but are not limited to a laptop computer, a notebook computer, a tablet computer, a mobile phone, a personal digital assistant (PDA), and a wearable computing device. Computer programs executing on computing device 102 may interface with authentication server 104 through application programming interfaces (APIs) and/or by other mechanisms.

As stated above, computing device 102 is configured to execute computer programs. For instance, as illustrated in FIG. 1, computing device 102 is configured to execute application 108. Application 108 may comprise any application. For example, application 112 may comprise a Web application or a locally-executed application, which may access data in a database. Application 108 may be viewed and interacted with in a Web browser application executed by computing device 102. As illustrated in FIG. 1, application 108 includes a registration client 116, a login client 118, one or more application magic square tables 120, and an application hash table 122. In some embodiments, registration client 116 and login client 118 may be separate applications.

Application magic square tables 120 may include one or more tables that store magic square values that are indexed by magic square table indices. For example, application magic square tables 120 may map a received magic square table index (selected by index selector 132) and a selected key option (received by login client 118) to a magic square value in application magic square tables 120. Application magic square tables 120 may be stored, for example, in memory of computing device 102 or external to computing device 102 (e.g., stored in authentication server 104) and accessed by login client 118 via network 106.

Application hash table 122 stores hash values that are indexed by hash indices. For example, application hash table 122 may map a received hash index (selected by index selector 132) to a hash value in application hash table 122. Application hash table 122 may be stored, for example, in memory of computing device 102.

Registration client 116 is configured to manage user registration of an account. In accordance with an embodiment, registration client 116 prompts a user to register a PIN and a set of keys, receives the user-registered PIN and set of keys, and transmits the user-registered PIN and set of keys to authentication server 104.

Login client 118 is configured to manage login to an account. In accordance with an embodiment, login client 118 is configured to receive a set of key options including a correct key option (selected by key selector 130) and information indicative of a hash value from authentication server 104. The correct key option may be a key of the set of keys or a "no key presented" option. The information indicative of a hash value may be a hash value (selected by index selector 132), a mask (generated by mask generator 134 based on the hash value), and/or a hash index (selected by index selector 132).

Login client 118 is further configured to prompt the user to select a key option and receive the key option selected by the user. Login client 118 identifies a set of N integers that sum to the key option selected by the user. For instance, login client 118 may receive a magic square table index from authentication server 104. In this context, login client 118 identifies the set of N integers by applying the received magic square table index and the key option selected by the user to application magic square tables 120. For example, in accordance with an embodiment, login client 118 determines a table of application magic square tables 120 based on the key option selected by the user and a row of the determined table based on the received magic square table index.

In embodiments, login client 118 prompts the user to enter a subset of PIN elements and receives the subset of PIN elements entered by the user. Login client 118 generates an encoded PIN by combining the set of N integers with the subset of PIN elements entered by the user in an order derived from the hash value. Login client 118 transmits the encoded PIN to authentication server 104.

Authentication server 104 is configured to manage user identities, manage login sessions, and authenticate user credentials. Authentication server 104 may be implemented as a combination of physical hardware devices and executing software applications. Authentication server 104 may be managed by a supporting service. A supporting service may comprise for example and without limitation a cloud computing service/application and/or enterprise service/application configured to manage authentication server 104 as an authentication service. As illustrated in FIG. 1, authentication server 104 includes an identity manager 110, a session manager 112, and an authentication manager 114. Authentication server 104 may interface with one or more databases, not shown in FIG. 1 for brevity and illustrative clarity.

Identity manager 110 is configured to manage user identities of registered users. For example, a user may register an account via registration client 116, which transmits the user information, user-registered PIN, and set of keys associated with the user to identity manager 110. As illustrated in FIG. 1, identity manager 110 includes a PIN mapping table 124, one or more server magic square tables 126, and a server hash table 128. Identity manager 110 populates PIN mapping table 124 with the user information, user-registered PIN, and set of keys of each user with an account managed by authentication server 104.

Server magic square tables 126 may include one or more tables that store magic square values that are indexed by corresponding magic square table indices. For instance, each server magic square table of server magic square tables 126 may include an index of magic square values for a respective key. In accordance with an embodiment, a subset of tables of server magic square tables 126 is generated for each user based on the set of keys registered by the respective user. In accordance with another embodiment, server magic square tables 126 includes a magic square table for each potential key of the set of keys that may be registered by a user. Server magic square tables 126 may be stored, for example, in a database, not shown in FIG. 1.

Server hash table 128 stores hash values that are indexed by corresponding hash indices. In accordance with an embodiment, each hash value is a permutation of an arrangement of M numeric characters and N alphabetic characters. Server hash table 128 may be stored, for example, in a database, not shown in FIG. 1.

Session manager 112 is configured to manage a login session in response to a user attempting to log into an account managed by authentication server 104. For instance, a user may request to log into an account by accessing login client 118. Session manager 112 is configured to generate a set of key options, information indicative of a hash value, and expected PIN in response to the request. As illustrated in FIG. 1, session manager 112 includes a key selector 130, an index selector 132, a mask generator 134, and an expected PIN generator 136.

Key selector 130 is configured to randomly select a key of the set of keys registered by the user. For instance, key selector 130 may reference PIN mapping table 124 and randomly select a key of the set of keys registered by the user requesting access to an account. In accordance with an embodiment, key selector 130 is configured to select a key from the set of keys that is different than a previously selected key of the set of keys. Key selector 130 is further configured to generate a set of key options. The set of key options may be generated based on the randomly selected key or generated randomly. The set of key options includes a correct key option and one or more incorrect key options. In accordance with an embodiment, the correct key option is either the randomly selected key or a "no key presented" option. The "no key presented" option may be a character string indicating, a null value, "0", "00", and/or another option to indicate that no key of the set of keys registered by the user was available among the set of key options, as would be understood by a person of skill in the relevant art(s) having the benefit of this disclosure. The number of key options in the set of key options may be updated dynamically or may be predetermined.

Index selector 132 is configured to select a hash index. For instance, index selector 132 randomly selects a hash index of server hash table 128. In accordance with an embodiment, index selector 132 is configured to select a hash index from server hash table 128 that is different than a previously selected hash index. In accordance with an embodiment, index selector 132 is further configured to randomly select a magic square table index of server magic square tables 126 based on the correct key option generated by key selector 130.

Mask generator 134 is configured to generate a mask. For instance, mask generator 134 is configured to generate a mask based on the hash value corresponding to the hash index randomly selected by index selector 132. While mask generator 134 is shown as a subcomponent of session manager 112, it is contemplated herein that mask generator 134 may be a component of authentication server 104, a subcomponent of identity manager 110, a component of application 108, or a subcomponent of login client 118.

Expected PIN generator 136 is configured to generate an expected PIN based on the hash value corresponding to the hash index randomly selected by index selector 132, the user-registered PIN, and the correct key option.

As stated above, session manager 112 is configured to generate a set of key options, information indicative of a hash value, and an expected PIN in response to the user login request. In accordance with an embodiment, session manager 112 transmits the set of key options, the information indicative of a hash value, and the magic square table index to login client 118 over network 106. The information indicative of a hash value may include one or more of the hash index randomly selected by index selector 132, the hash value corresponding to the hash index randomly selected by index selector 132, and/or the mask generated by mask generator 134, depending on the particular implementation.

Authentication manager 114 is configured to determine an authenticity of a user and a risk score associated with the authenticity determination. As illustrated in FIG. 1, authentication manager 114 includes an authenticator 138 and a risk score determiner 140. Authenticator 138 is configured to receive an encoded PIN from login client 118 and an expected PIN from expected PIN generator 136. Authenticator 138 compares the encoded PIN to the expected PIN to make an authentication decision. If the encoded PIN matches the expected PIN, authenticator 138 authenticates the user, otherwise the user is not authenticated.

Risk score determiner 140 is configured to determine a risk score if a user is not authenticated by authenticator 138. Risk score determiner 140 may determine the risk score in a variety of ways. For instance, in accordance with an embodiment, risk score 140 determines the risk score based on whether the set of N integers identified by login client 118 correspond to an expected set of N integers and an extent to which the subset of PIN elements entered by the user match registered values of the subset of PIN elements of the user-registered PIN. Depending on the risk score, risk score determiner 140 may prevent future login attempts, limit a number of additional login attempts, or allow an additional login attempt without a limit.

Network 106 may comprise at least one network and/or direct connection (i.e., a communication link), or any combination thereof. That is, network 106 may be any combination of the Internet, the "cloud", direct communication links, business and/or enterprise networks, and/or the like. In embodiments, network 106 is configured to communicatively couple computing device 102 and authentication server 106 to each other.

System 100 may include additional components and/or subcomponents not shown in FIG. 1 for illustrative simplicity and brevity.

Figure 2A:
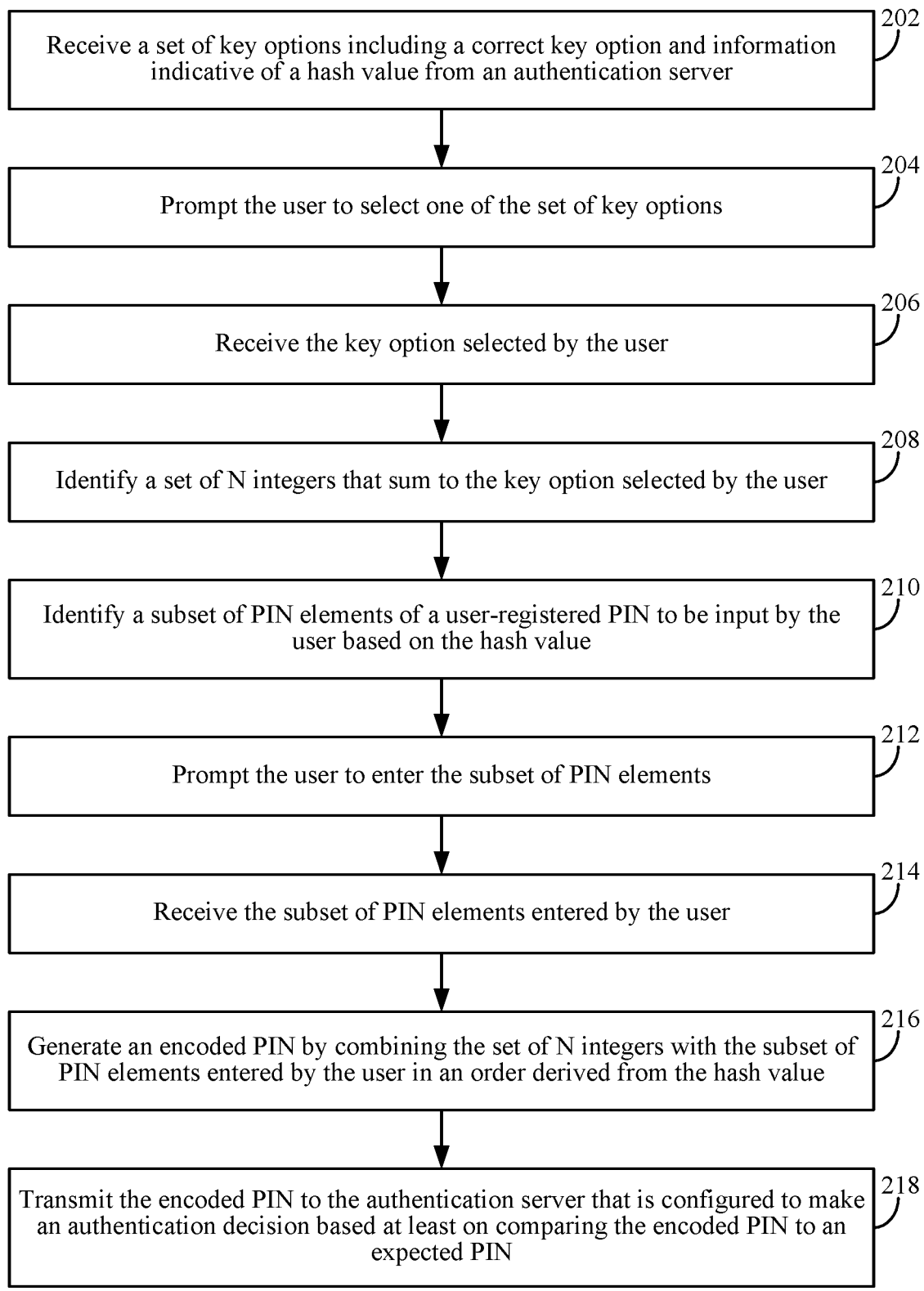
FIG. 2A is a flowchart of a process for secure account login, according to an example embodiment.

Note that login client 118 of system 100 as illustrated in FIG. 1 may operate in various ways, in embodiments. For instance, FIG. 2A is a flowchart 200 of a process for secure account login, according to an example embodiment. In an embodiment, login client 118 may operate to perform one or all of the steps of flowchart 200. Flowchart 200 is described as follows with respect to system 100 of FIG. 1. Further structural and operational embodiments will be apparent to persons skilled in the relevant art(s) based on the following description. Note that not all steps of flowchart 200 need to be performed in all embodiments.

Flowchart 200 starts at step 202. In step 202, a set of key options including a correct key option and information indicative of a hash value are received from an authentication server. For instance, login client 118 of FIG. 1 receives a set of key options including a correct key option and information indicative of a hash value from session manager 112 of authentication server 104. The correct key option may be a key of the set of keys registered by the user or a "no key presented" option. The information indicative of a hash value may be one or more of a hash index selected by index selector 132, a hash value corresponding to the hash index selected by index selector 132, and/or a mask generated by mask generator 134.

In step 204, the user is prompted to select one of the set of key options. For instance, login client 118 of FIG. 1 prompts the user to select one of the set of key options received in step 202. The user may select one of the set of key options using a physical peripheral device (e.g., mouse, keyboard, joystick, etc.), a virtual keyboard or keypad, a touch input (e.g., a touchscreen or touchpad), a biometric input (e.g., gesture command, voice command, etc.), or other method of input to a computing device. In step 206, the key option selected by the user is received. For instance, login client 118 receives the key option selected by the user.

In step 208, a set of N integers that sum to the key option selected by the user are identified. For instance, login client 118 identifies the set of N integers that sum to the key option received in step 206.

In step 210, a subset of PIN elements of a user-registered PIN to be input by the user based on the hash value are identified. For instance, login client 118 of FIG. 1 identifies the subset of PIN elements of a user-registered PIN to be input by the user based on the hash value indicated by the information indicative of the hash value received in step 202. The subset of PIN elements may include some or all of the PIN elements of the user-registered PIN.

In step 212, the user is prompted to enter the subset of PIN elements. For instance, login client 118 of FIG. 1 prompts the user to enter the subset of PIN elements. The subset of PIN elements may be requested in their registered order, in a randomized order, or in an order based on the hash value, depending on the particular implementation. In accordance with an embodiment, the login client presents a PIN entry interface element for the user to enter the subset of PIN elements.

In step 214, the subset of PIN elements entered by the user are received. For instance, login client 118 receives the subset of PIN elements entered by the user. The subset of PIN elements may be entered by using a physical peripheral device (e.g., a keyboard, a keypad, etc.), a virtual keyboard or keypad, a biometric input (e.g., a voice command or gesture), or another method of input to a computing device.

In step 216, an encoded PIN is generated by combining the set of N integers with the subset of PIN elements entered by the user in an order derived from the hash value. For instance, login client 118 combines the set of N integers identified in step 208 with the subset of PIN elements received in step 214 to generate the encoded PIN. In accordance with an embodiment, the order of the set of N integers and the subset of PIN elements within the encoded PIN is based on the hash value.

In step 218, the encoded PIN is transmitted to the authentication server that is configured to make an authentication decision based at least on comparing the encoded PIN to an expected PIN. For instance, login client 118 transmits the encoded PIN to authentication manager 114 of authentication server 104 over network 106. Authenticator 138 of authentication manager 114 is configured to make an authentication decision based at least on comparing the encoded PIN to an expected PIN.

Figure 2B:
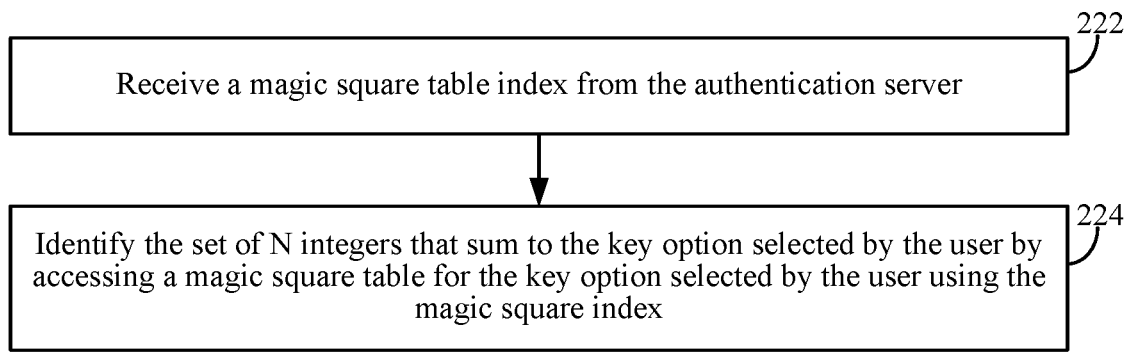
FIG. 2B is a flowchart of a process for identifying a set of N integers, according to an example embodiment.

Note that in embodiments, step 208 may be performed in various ways. For instance, FIG. 2B is a flowchart 220 of a process for identifying a set of N integers, according to an example embodiment. In an embodiment, flowchart 220 is an example process for step 208 of FIG. 2A, and login client 118 may be configured to perform the steps of flowchart 220. Flowchart 220 is described as follows with respect to system 100 of FIG. 1. Further structural and operational embodiments will be apparent to persons skilled in the relevant art(s) based on the following description. Note that not all steps of flowchart 220 need to be performed in all embodiments.

Flowchart 220 starts at step 222. In step 222, a magic square table index is received from the authentication server. For instance, login client 118 receives a magic square table index selected by index selector 132 from session manager 112 of authentication server 104. In accordance with an embodiment, step 222 may be performed as part of step 202 of flowchart 200.

In step 224, the set of N integers that sum to the key option selected by the user are identified. The set of N integers are identified by accessing a magic square table for the key option selected by the user using the magic square table index. For instance, login client 118 determines a particular magic square table from among application magic square tables 120 based on the key option received in step 206. Login client 118 then applies the magic square table index to the determined magic square table to identify the set of N integers.

Figure 2C:
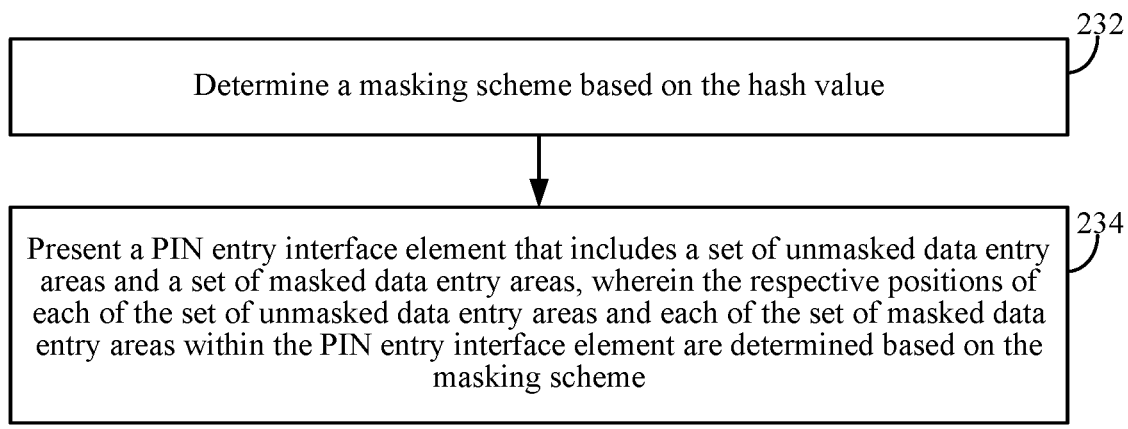
FIG. 2C is a flowchart of a process for prompting a user to enter a subset of PIN elements, according to an example embodiment.

Note that in embodiments, step 212 may be performed in various ways. For instance, FIG. 2C is a flowchart 230 of a process for prompting a user to enter a subset of PIN elements, according to an example embodiment. In an embodiment, flowchart 230 is an example process for step 212 of FIG. 2A. Login client 118 and/or mask generator 134 may be configured to perform one or all of the steps of flowchart 230. Flowchart 230 is described as follows with respect to system 100 of FIG. 1. Further structural and operation embodiments will be apparent to persons skilled in the relevant art(s) based on the following description. Note that not all steps of flowchart 230 need to be performed in all embodiments.

Flowchart 230 starts at step 232. In step 232, a masking scheme is determined based on the hash value. For instance, mask generator 134 of FIG. 1 is configured to determine a masking scheme based on the hash value corresponding with the hash index randomly selected by index selector 132. Masking schemes may be determined in various ways. For instance, a masking scheme in accordance with an embodiment includes a rule for masking at least the elements corresponding to the alphabetic characters of the hash value.

In step 234, a PIN entry interface element is presented. For instance, login client 118 of FIG. 1 may be configured to present a PIN entry interface element to the user. The PIN entry interface element includes a set of unmasked data entry areas and a set of masked data entry areas. The respected positions of each of the set of unmasked data entry areas and each of the set of masked data entry areas within the PIN entry interface element are determined based on the masking scheme. Each unmasked data entry area of the set of unmasked data entry areas is adapted to receive and display user input of a particular PIN element of the subset of PIN elements. In accordance with an embodiment, user inputs may be masked upon entry in the unmasked data entry area. In contrast to the unmasked data entry areas, each masked data entry area of the set of masked data entry areas is uneditable by the user. In accordance with an embodiment, the set of masked data entry areas includes a first subset and a second subset. Each masked data entry area of the first subset resembles an unmasked data entry area with a masked input and is uneditable by the user. Each masked data entry area of the second subset is uneditable by the user. In a non-limiting example, each masked data entry area of the second subset displays an uneditable character.

Virtual keypads or keyboards may be used as a substitute for a physical keyboard during registration of user credentials or when entering login credentials. For example, when a virtual keypad/keyboard option is used at the time of login, a keyboard appears on the screen of the computing device. Inputs are provided via selecting on-screen keys (e.g., by clicking a mouse or touching a touchscreen). Virtual keypads/keyboards may be scrambled, where the position of keys on the virtual keypad/keyboard are changed every time a user attempts to log into an account. A scrambled virtual keyboard/keypad may make it difficult for a hacker or malware to capture user inputs.

Figure 3:
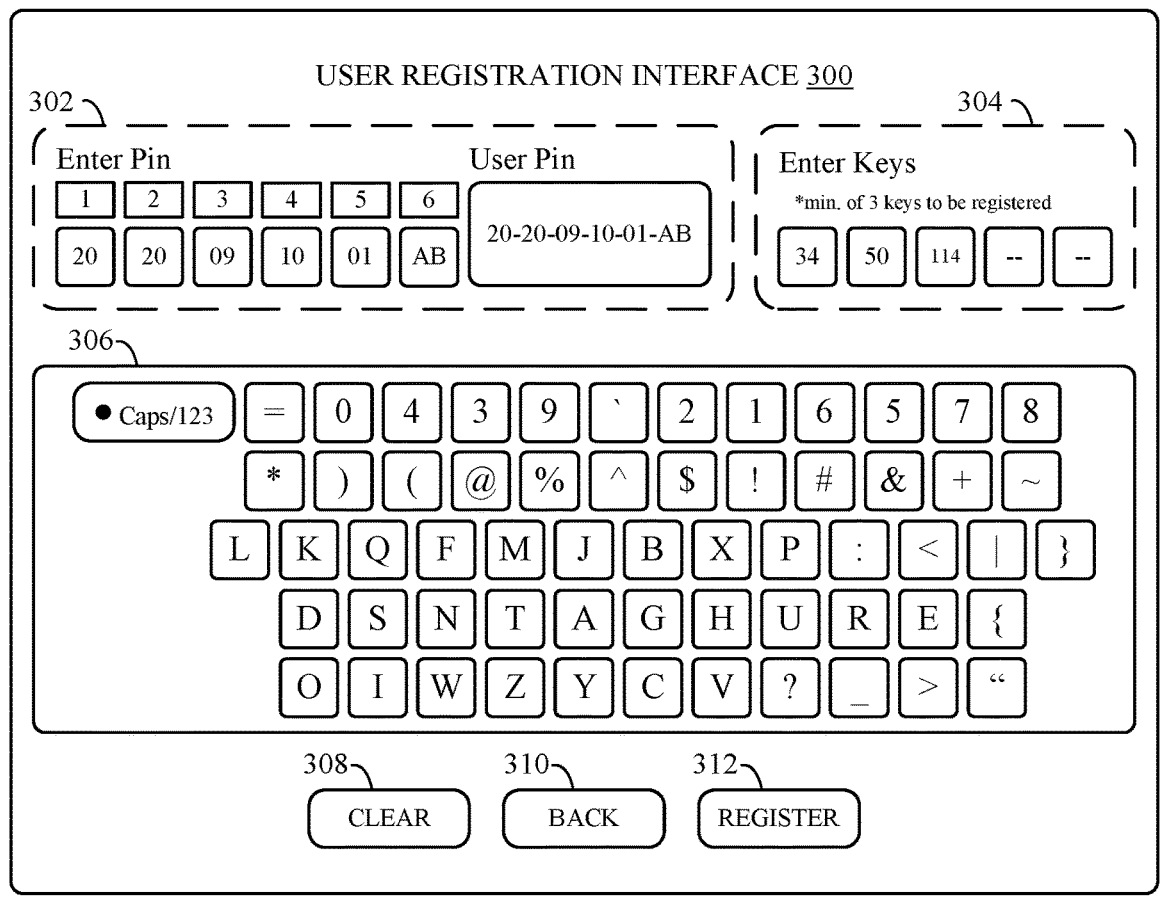
FIG. 3 depicts an example user registration interface, according to an example embodiment.

Virtual keypads/keyboards may be implemented in various ways, in embodiments. For example, a virtual keypad/keyboard may be implemented in a user registration interface managed by a registration client, such as registration client 116 of system 100 in FIG. 1. For instance, FIG. 3 depicts an example user registration interface 300 ("interface 300" herein), according to an example embodiment. Further structural and operational examples will be apparent to persons skilled in the relevant art(s) based on the following descriptions. Interface 300 is described as follows with respect to system 100 of FIG. 1.

Interface 300 is managed by registration client 116 of FIG. 1. Registration client 116 may present a user with interface 300 when the user is directed to an account registration webpage, opens an account registration application, or otherwise is directed to an interface for registering an account. Interface 300 includes a PIN registration interface element 302, a key registration interface element 304, a virtual keyboard 306, a clear button 308, a back button 310, and a register button 312.

PIN registration interface element 302 is configured to prompt a user to register a PIN, receive PIN elements entered by a user, and display the received PIN elements. Pin registration interface element 302 includes a prompt labeled "Enter PIN", PIN character number boxes labeled "1", "2", "3", "4", "5", and "6", a set of registration data entry elements, and a user-registered PIN display window. In various embodiments, one or more components of PIN registration interface element 302 may be omitted or obscured from view. For instance, in accordance with an embodiment, the PIN character number boxes may not be visible to a user interacting with interface 300. In some embodiments, entries in the set of registration data entry elements may be obscured (e.g., via a mask). As illustrated in FIG. 3, each registration data entry element of PIN registration interface element 302 allows for entry of two characters, however, it is contemplated herein that data entry elements may allow for different numbers of characters or a range of characters, depending on the particular implementation.

Key registration interface element 304 is configured to prompt a user to register a set of keys, receive keys entered by the user, and display the received keys. Key registration interface element 304 includes a prompt labeled "Enter Keys" and a set of key data entry elements. Embodiments of key registration interface elements may indicate a minimum, maximum, or set number of keys to be entered by the user. For instance, as illustrated in FIG. 3, key registration interface element 304 prompts the user to enter a minimum of three keys to register an account. Key registration interface element 304 may include text indicating a range of acceptable keys. While key registration interface element 304 illustrates a set of key data entry elements for a user to enter keys, it is contemplated herein that keys may be entered using other input controls (e.g., drop-down menus). Furthermore, in accordance with an embodiment, a single key data entry element may be presented to the user wherein each entered key is separated by a predetermined character (e.g., a space, a comma, a semicolon, or another special character).

Virtual keyboard 306 is an input control for a user to enter PIN elements in PIN registration interface element 302 and keys in key registration interface element 304. As illustrated in FIG. 3, virtual keyboard 306 is a scrambled virtual keyboard. Virtual keyboard 306 may be re-scrambled each time the user accesses interface 300 and/or after the user is prompted to reattempt registration. Virtual keyboard 306 includes a caps lock key labeled "Caps/123". A user may toggle between lowercase and uppercase letters by selecting the caps lock. In some embodiments, selecting the caps lock key also toggles characters of numeric and special character keys.

Interface 300 may include additional input controls. For example, as stated above, interface 300 includes clear button 308, back button 310, and register button 312. Clear button 308 is configured to clear entries in registration data entry elements of PIN registration interface element 302 and/or entries in key data entry elements of key registration interface element 304. Back button 310 is configured to perform a backspace function for removing characters entered in registration data entry elements and/or key data entry elements.

Registration button 312 is configured to confirm a user's entries received in registration data entry elements of PIN registration interface element 302 and in key data entry elements of key registration interface element 304. For instance, in accordance with an embodiment, registration client 116 of FIG. 1 confirms entries received in registration data entry elements of PIN registration interface element 302, entries received in key data entry elements of key registration interface element 304, the size of the PIN entered by the user, the size of each PIN element, and the number of keys entered are acceptable for registration of an account. If registration client 116 determines the user's entries are acceptable, interface 300 may display a message confirming account registration, redirect the user to an account registration confirmation page, or otherwise indicate to the user that an account was successfully registered. If registration client 116 determines one or more of the user's entries are not acceptable, interface 300 may display one or more error messages indicating one or more entries were not acceptable for account registration. In some embodiments, the one or more error messages may indicate which entries were not acceptable and/or which errors were detected in an entry.

Interface 300 may include additional input controls not shown in FIG. 3 for brevity and illustrative clarity. For instance, interface 300 may include an input control for performing functions such as returning to a previous window, closing interface 300, requesting assistance, and/or other functions applicable to user registration interfaces.

Figure 4:
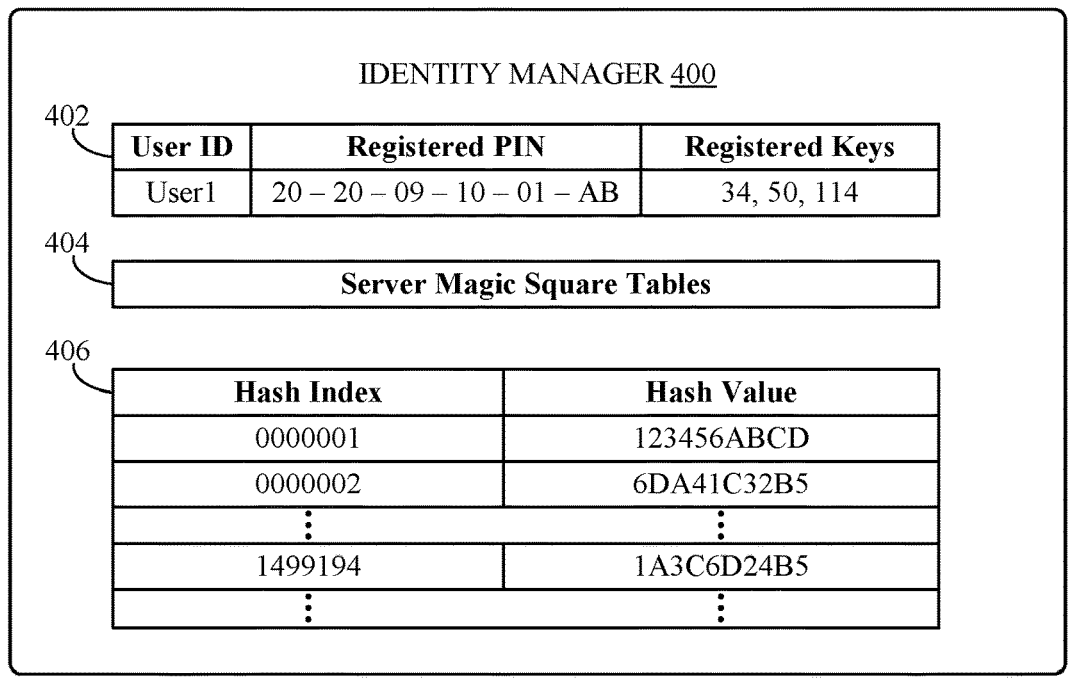
FIG. 4 is a block diagram of an identity manager, according to an example embodiment.

Note that user information may be managed and stored in various ways, in embodiments. For instance, FIG. 4 is a block diagram of an identity manager 400, according to an example embodiment. Identity manager 400 is a further embodiment of identity manager 110 of FIG. 1. Identity manager 400 is described below with respect to system 100 of FIG. 1 and interface 300 of FIG. 3. Further structural and operational examples will be apparent to persons skilled in the relevant art(s) based on the following descriptions.

Identity manager 400 is configured to manage and store PIN mapping tables, magic square tables, and hash tables for authentication server 104 of FIG. 1. As illustrated in FIG. 4, identity manager 400 includes a PIN mapping table 402, server magic square tables 404, and server hash table 406. PIN mapping table 402 is a further embodiment of PIN mapping table 124 of FIG. 1. PIN mapping table 402 includes a set of columns for storing user identifiers (IDs), user-registered PINs, and a registered set of keys. It is contemplated herein that PIN mapping table 402 may include additional columns for storing and mapping additional information to a user such as security information (e.g., usernames, passwords, security questions, security answers) and account information (e.g., names, mailing addresses, billing addresses, phone numbers, e-mail addresses, account numbers), and/or the like. In a non-limiting example embodiment, account information is stored in a database separate from PIN mapping table 402. As illustrated PIN mapping table 402 includes information associated with a single user, "User1", however, it is contemplated herein that a PIN mapping table 402 may include information for every user or a subset of users associated with authentication server 104.

Server magic square tables 404 is a further embodiment of server magic square tables 126 of FIG. 1. Server magic square tables 404 may include one or more tables that store magic square values that are indexed by corresponding magic square table indices. In accordance with an embodiment, a subset of tables of server magic square tables 404 is generated for each user. In accordance with another embodiment, server magic square tables 404 includes a magic square table for each potential key of the set of keys that may be registered by a user.

Server hash table 406 is a further embodiment of server hash table 128. Server hash table 406 is configured to store hash values that are indexed by corresponding hash indices. In accordance with an embodiment, each hash value is a permutation of an arrangement of M numeric characters and N alphabetic characters. For instance, hash values stored in hash table 406 are permutations of arrangements of numeric characters "1", "2", "3", "4", "5", and "6" and alphabetic characters "A", "B", "C", and "D". In accordance with an embodiment, M is equal to the number of PIN elements in the user registered PIN stored in PIN mapping table 402 and N is proportionate to the size of the magic squares associated with server magic square tables 404 (e.g., N may be 4 if the magic squares are 4-by-4 2-D arrays). While the hash indices illustrated in FIG. 4 are 7-digit numbers, other magnitudes of hash indices may be used.

In embodiments, magic square values may be determined in various ways. For instance, FIG. 5A depicts example magic squares 500A ("magic squares 500A" herein) corresponding to the user-registered keys shown in the example PIN mapping table 402 of FIG. 4. Further structural and operational examples will be apparent to persons skilled in the relevant art(s) based on the following descriptions. Magic squares 500A are described as follows with respect to identity manager 400 of FIG. 4.

As illustrated in FIG. 5A, magic squares 500A include magic square 502, magic square 504, and magic square 506, each corresponding to a registered key of PIN mapping table 402 stored in identity manager 400 as illustrated in FIG. 4. Magic square 502 corresponds to key 34, magic square 504 corresponds to key 50, and magic square 506 corresponds to key 114. Each magic square of magic squares 500A is a 4-by-4 2-D array where the sum of the values ("magic square values" herein) in any one column, row, or diagonal is equivalent to the value of the corresponding key for that magic square. For instance, the sum of the magic square values in any one column, row, or diagonal of magic square 502 is 34. In accordance with an embodiment, each integer of a magic square is unique within that magic square (i.e., an integer only appears once in that particular magic square). While only one magic square is shown for each registered key in FIG. 5A, it is contemplated herein that any number of magic squares may be used for each registered key depending on the particular implementation. Furthermore, it is contemplated herein that sets of magic squares may be generated and stored for each potential key that may be registered by a user. While each magic square of magic squares 500A are 4-by-4 2-D arrays, other implementations may use other sizes of 2-D arrays (e.g., 3-by-3, 5-by-5, or any other size of a 2-D array). As illustrated in FIG. 5A, magic squares 500A include positive integers; however, it is contemplated herein that magic squares in accordance with an embodiment may include positive integers, negative integers, or both positive and negative integers.

In embodiments, magic square values may be stored in various ways. For instance, FIG. 5B depicts example magic square tables 500B ("magic square tables 500B" herein) corresponding to magic squares 500A shown in FIG. 5A. Magic square tables 500B are further embodiments of server magic square tables 404 of FIG. 4. Further structural and operational examples will be apparent to persons skilled in the relevant art(s) based on the following descriptions. Magic square tables 500B are described as follows with respect to system 100 of FIG. 1, identity manager 400 of FIG. 4, and magic squares 500A of FIG. 5A.

As illustrated in FIG. 5B, magic square tables 500B includes magic square table 508, magic square table 510, and magic square table 512, each corresponding to a registered key of PIN mapping table 402 stored in identity manager 400 as illustrated in FIG. 4. Magic square table 508 corresponds to key 34, magic square table 510 corresponds to key 50, and magic square table 512 corresponds to key 114. Each magic square table of magic square tables 500B includes a set of magic square table indices and corresponding magic square values. Each magic square table of magic square tables 500B are illustrated in FIG. 5B as storing magic square values for only one magic square for brevity and illustrative clarity, however, it is contemplated herein that magic square tables may store and index magic square values for multiple magic squares corresponding to a respective key of that magic square table. A set of magic square values may be retrieved from a magic square table by indicating a key and a magic square table index. For instance, expected PIN generator 136 may retrieve a set of magic square values by applying a selected key received from key selector 130 and a magic square table index received from index selector 132 to magic square tables 500B. In this context, the selected key is used to determine which magic square table of set of magic square tables 500B is to be used and the magic square table index is used to identify the magic square values.

Figure 6A:
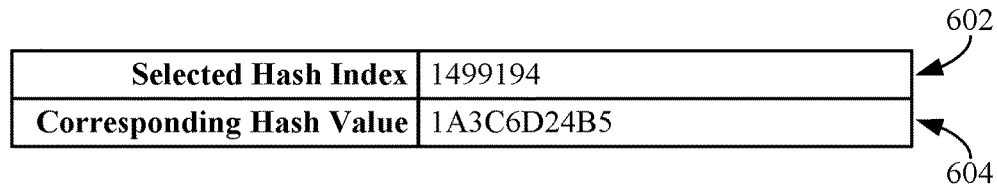
FIG. 6A depicts an example of a selected hash index with a corresponding hash value, according to an example embodiment.

In embodiments, hash indices and corresponding hash values may be selected and mapped in various ways. For instance, FIG. 6A depicts an example of a selected hash index 602 ("hash index 602" herein) with a corresponding hash value 604 ("hash value 604" herein), according to an example embodiment. Further structural and operational examples will be apparent to persons skilled in the relevant art(s) based on the following descriptions. FIG. 6A is described as follows with respect to system 100 of FIG. 1 and identity manager 400 of FIG. 4.

As illustrated in FIG. 6A, hash index 602 has a value of "1499194" and hash value has a value of "1A3C6D24B5". Hash index 602 may be selected (e.g., randomly selected) by index selector 132 of FIG. 1 from server hash table 406 of FIG. 4. While hash index 602 is illustrated in FIG. 6A as a 7-digit number, other magnitudes may be used. Hash index 602 maps to hash value 604 stored in server hash table 406.

Figure 6B:
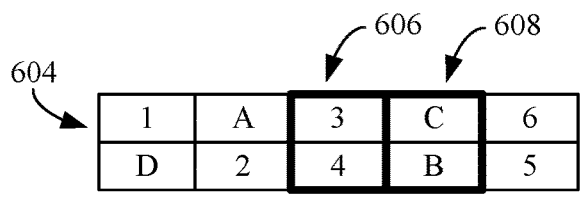
FIG. 6B depicts the example corresponding hash value of FIG. 6A annotated with guides used to construct a mask according to a masking scheme.

In embodiments, masks may be generated in various ways. For instance, FIG. 6B depicts hash value 604 of FIG. 6A annotated with guides used to construct a mask according to a masking scheme. Further structural and operational examples will be apparent to persons skilled in the relevant art(s) based on the following descriptions. FIG. 6B is described as follows with respect to system 100 of FIG. 1, identity manager 400 of FIG. 4, magic square tables 500B of FIG. 5B, and corresponding hash value 604 of FIG. 6A.

As illustrated, FIG. 6B includes hash value 604 as illustrated and described with respect to FIG. 6A. FIG. 6B includes guides 606 and 608. Guides 606 and 608 may be used to understand identifying which positions in a mask should be masked. The steps for generating a mask in accordance with an embodiment of a masking scheme include: (1) selecting a hash value, (2) partitioning the hash value, (3) identifying a first set of hash elements, and (4) identifying a second set of hash elements. These steps will now be briefly described.

Selecting a Hash Value: As described above with respect to FIG. 6A, hash value 604 is selected by index selector 132 of FIG. 1 randomly selecting a hash index (e.g., hash index 602) from server hash table 406 of FIG. 4. Mask generator 134 may receive hash value 604 directly from index selector 132, receive hash value 604 from another component of session manager 112, or may receive hash index 602 and retrieve hash value 604 by applying hash index 602 to server hash table 128.

Partitioning the Hash Value: Mask generator 134 partitions hash value 604 into two parts (e.g., two equal-length parts or two non-equal-length parts).

Identifying a First Set of Hash Elements: Mask generator 134 is configured to identify the first matching set of numeric characters of the partitions of hash value 604. In this context, a matching set of numeric characters is when the characters in the same position of respective partitions are both numeric characters. For instance, as illustrated in FIG. 6B, guide 606 indicates a first set of matching numeric characters "3" and "4" of hash value 604. In accordance with an embodiment, mask generator 134 is configured to select and mask PIN elements of the user registered PIN that correspond respectively to the first set of matching numeric characters. For instance, in the context of PIN mapping table 402 of FIG. 4, PIN element "09" that corresponds to numeric character 3 and PIN element "10" that corresponds to numeric character 4 are selected and masked. In some embodiments, the elements of the user registered PIN that correspond to the first set of matching numeric characters are masked with a character "×". While the example illustrated in FIG. 6B has a first matching set of numeric characters, it is contemplated herein that some hash values may have no matching sets of numeric characters.

Identifying a Second set of Hash Elements: Mask generator 134 is configured to identify the first matching alphabetic characters of the partitions of hash value 604. In this context, a matching set of alphabetic characters is when the characters in the same position of respective partitions are both alphabetic characters. For instance, as illustrated in FIG. 6B, guide 608 indicates a first set of matching alphabetic characters "C" and "B" of hash value 604. In accordance with an embodiment, mask generator 134 is configured to select and mask magic square values that correspond respectively to the first set of matching alphabetic characters. For instance, if key selector 130 of FIG. 1 selects "34" from PIN mapping table 402 and index selector 132 selects "0000001" as a magic square table index, magic square value "11" corresponding to alphabetic character C and magic square value "06" corresponding to alphabetic character B are selected and masked. In some embodiments, the magic square values that correspond to the first set of matching numeric characters are masked with a character "×". While the example illustrated in FIG. 6B has a first matching set of alphabet characters, it is contemplated herein that some hash values may have no matching sets of alphabetic characters.

Figure 6C:
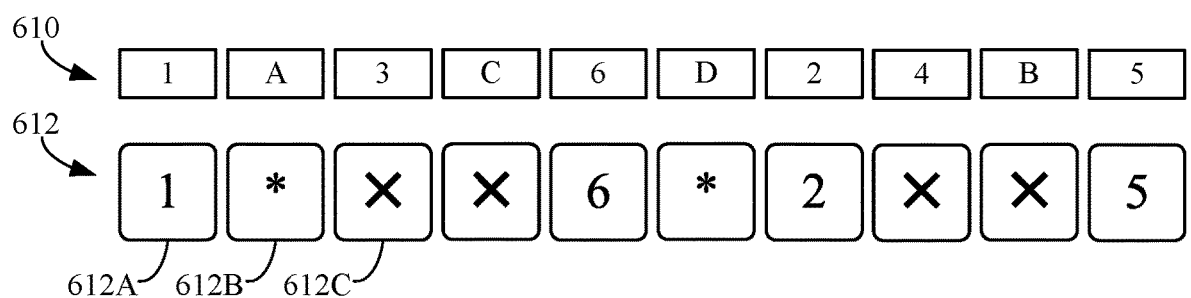
FIG. 6C depicts a PIN entry interface element masked in accordance with the mask described with respect to FIG. 6B.

In embodiments, masks may be displayed in various ways. For instance, FIG. 6C depicts a PIN entry interface element 612 masked in accordance with the mask described with respect to FIG. 6B. Further structural and operational examples will be apparent to persons skilled in the relevant art(s) based on the following descriptions. FIG. 6C is described as follows with respect to system 100 of FIG. 1.

As illustrated in FIG. 6C, PIN entry interface element 612 includes a set of unmasked data entry areas such as unmasked data entry area 612A, a first subset of a set of masked data entry areas such as masked data entry area 612B, and a second subset of a set of masked data entry areas such as masked data entry area 612C. FIG. 6C further includes a guide 610 that may be used to understand the organization of unmasked data entry areas and masked data entry areas of PIN entry interface element 612. For example, each box of guide 610 corresponds to a data entry area of PIN entry interface element 612. Each box of guide 610 includes a hash element of hash value 604 as illustrated and described with respect to FIG. 6A and FIG. 6B above. It should be understood that guide 610 would not normally be included within PIN entry interface element 612 but has been included in FIG. 6C to help explain certain concepts.

Unmasked data entry areas such as unmasked data entry area 612A may be configured in various ways. For example, as illustrated in FIG. 6C, each unmasked data entry area includes a numeric character corresponding to a numeric character of hash value 604. For instance, unmasked data entry area 612A includes numeric character "1". In accordance with an embodiment, unmasked data entry areas indicate data entry areas for a user to enter a subset of PIN elements, wherein the numeric character initially displayed within each unmasked data entry element identifies a corresponding element of the user registered PIN to be entered therein, as described further below with respect to FIG. 7.

Masked data entry areas may be masked in a variety of ways. For instance, the first subset of the set of masked data entry areas, such as masked data entry area 612B, are masked with a first mask. These masked data entry areas correspond to alphabetic characters of hash value 604 that were not identified as part of the first set of matching alphabetic characters, as illustrated and described above with respect to FIG. 6B. As illustrated in FIG. 6C, each masked data entry area in the first subset resembles an unmasked data entry area with a masked input and are uneditable.

The second subset of the set of masked data entry areas, such as masked data entry area 612C, are masked with a second mask. These masked data entry areas correspond to the identified first and second set of hash elements, as illustrated and described above with respect to FIG. 6B. As illustrated in FIG. 6C, the first subset of the set of masked data entry areas are labeled with a character "×" and are uneditable. While the first and second subset of masked data entry areas are illustrated differently in FIG. 6C, it is contemplated herein that the first and second subset of masked data entry areas may share the same appearance, depending on the particular implementation.

Thus, example embodiments have been described for understanding a method for generating a mask according to a masking scheme with respect to FIGS. 6A-6C. In accordance with an embodiment, mask generator 134 may transmit the generated mask to login client 118, or a component of authentication server 104 may receive the generated mask for transmission to login client 118. For instance, in the context of FIGS. 6A-6C, mask generator 134 may generate a masking scheme "1*××6*2××5" for transmission to login client 118.

Figure 7:
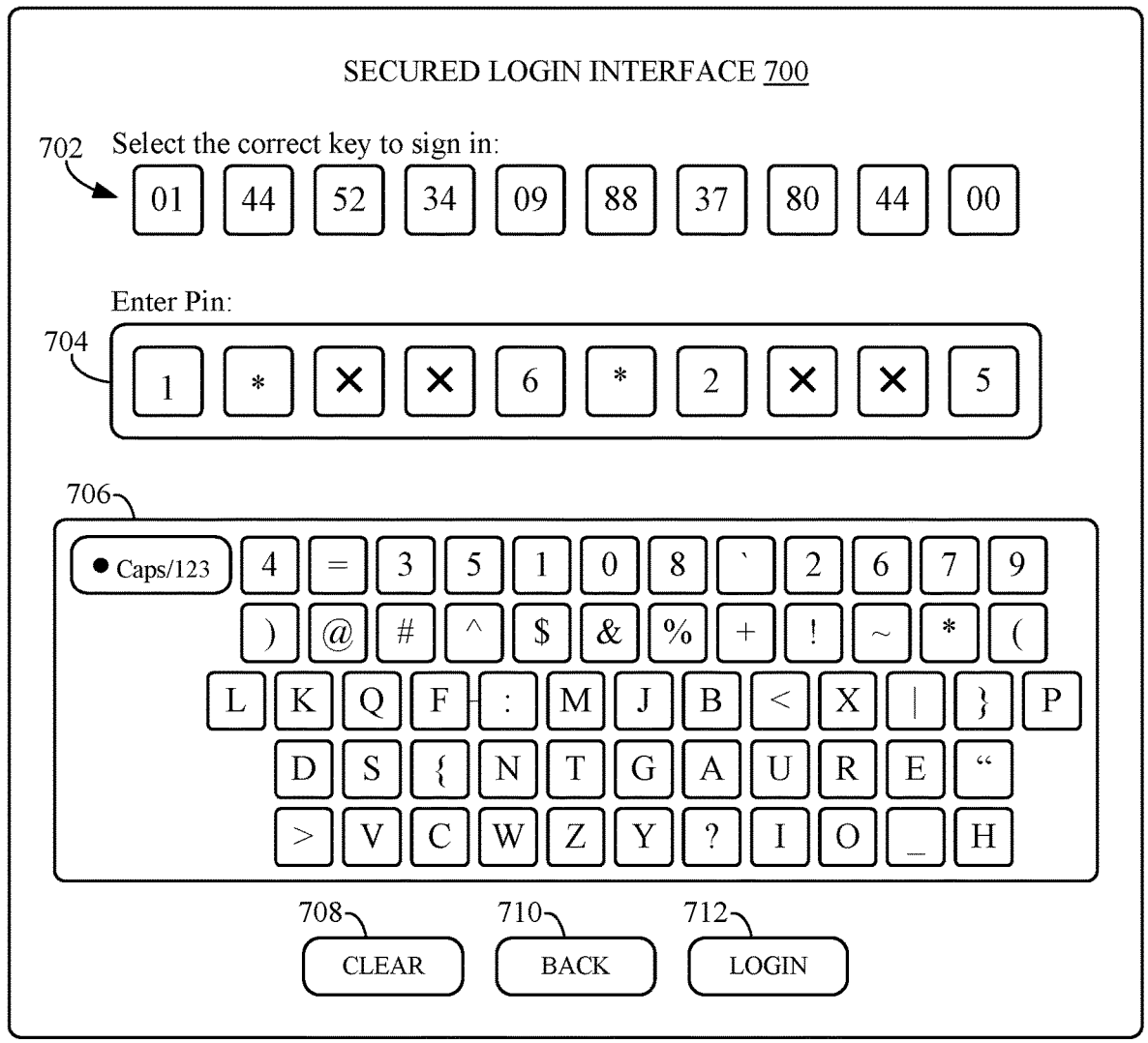
FIG. 7 depicts an example secured login interface, according to an example embodiment.

Login clients such as login client 118 of FIG. 1 may be configured to present a login interface for a user to log into an account. Such login interfaces may be configured in various ways. For instance, FIG. 7 depicts an example secured login interface 700 ("interface 700" herein), according to an example embodiment. Further structural and operational examples will be apparent to persons skilled in the relevant art(s) based on the following descriptions. Interface 700 is described as follows with respect to system 100 of FIG. 1, flowchart 200 of FIG. 2A, interface 300 of FIG. 3, and PIN entry interface element 612 of FIG. 6C.

Interface 700 is managed by login client 118 of FIG. 1. Login client 118 may present a user with interface 700 when the user is directed to an account login webpage, opens an account login application, or otherwise is directed to an interface for logging into an account. Interface 700 includes a key selection interface element 702, a PIN entry interface element 704, a virtual keyboard 706, a clear button 708, a back button 710, and a login button 712.

Key selection interface element 702 is configured to present the user with a set of key options. In accordance with an embodiment, login client 118 of FIG. 1 receives the set of key options from authentication server 104, as described with respect to step 202 of flowchart 200 of FIG. 2A. In this context, login client 116 determines a configuration of key selection interface element 702 according to the received set of key options. As illustrated in FIG. 7, the set of key options are "01", "44", "52", "34", "09", "88", "37", "80", "44", and "00". In this example, "00" represents a "no key presented" option, however it is contemplated herein that the "no key presented" option may be implemented as a text option (e.g., a text option labeled "No key presented").

PIN entry interface element 704 is configured to present the user with one or more data entry areas. Login client 118 of FIG. 1 receives information indicative of a hash value from authentication server 104, as described with respect to step 202 of flowchart 200 of FIG. 2A. In this context, login client 116 determines a configuration PIN entry interface element 704 according to the received information. For instance, the configuration of PIN entry interface element 704 is based on hash value 604 of FIG. 6A and the masking scheme described with respect to FIG. 6C. PIN entry interface element 704 includes unmasked data entry areas and masked data entry areas. The unmasked data entry areas are labeled with a numeric character indicative a position of a PIN element of the user-registered PIN mapped to the user in PIN mapping table 402 of FIG. 4. For instance, as illustrated in FIG. 7, the unmasked data entry areas are labeled with numeric characters "1", "6", "2", and "5". The user is prompted to enter PIN elements corresponding to the position indicated by the numeric characters of each unmasked data entry. That is to say, the labels "1", "6", "2", and "5" are intended to guide the user to enter the first, sixth, second and fifth elements of their user registered PIN, respectively. A user's entry in an unmasked data entry area may be displayed or obscured (e.g., by a mask) depending on the particular implementation.

The masked data entry areas of PIN entry interface element 704 are uneditable data entry areas. The masked data entry areas include a first subset and a second subset, as described with respect to PIN entry interface element 612 of FIG. 6C. As illustrated in FIG. 7, the first subset of masked data entry areas resemble an unmasked data entry area with a masked input, "*", and the second subset of masked data entry areas are labeled with a "×" character. Depending on the particular implementation, the masked inputs may be labeled with labels other than "*" and "×" characters (e.g., a different special character, an alphabetic character, a numeric character, and/or a graphic). It is also contemplated herein that both the first subset and the second subset of masked data entry areas may have the same appearance in some embodiments. For instance, in accordance with an embodiment, both subsets of masked data entry areas resemble an unmasked data entry area with a masked input, "*".

While PIN entry interface element 704 displays the unmasked data entry areas, the first subset of the set of masked data entry areas, and the second subset of the set of masked data entry areas, it is contemplated herein that one or more types of data entry areas may be obscured from the user's view. For instance, a PIN entry interface element in accordance with an embodiment may obscure the second subset of the set of masked data entry areas from the user's view. In this context, only the unmasked data entry areas and the first subset of the set of masked data entry areas are presented to the user in the PIN entry interface element.

Virtual keyboard 706 is an input control for a user to enter PIN elements in PIN entry interface element 704. As illustrated in FIG. 7, virtual keyboard 706 is a scrambled virtual keyboard. Virtual keyboard 706 may be re-scrambled each time the user accesses interface 700 and/or after the user is prompted to reattempt logging in. Virtual keyboard 706 includes a caps lock key labeled "Caps/123". A user may toggle between lowercase and uppercase letters by selecting the caps lock. In some embodiments, selecting the caps lock key also toggles characters of numeric and special character keys.

Clear button 708 and back button 710 are configured to perform functions similar to clear button 308 and back button 310 of FIG. 3, respectively. For example, clear button 708 is configured to clear entries in key selection interface element 702 and/or PIN entry interface element 704 and back button 710 is configured to perform a backspace function.

Login button 712 is configured to initiate a transmission representative of a user's selection with respect to key selection interface element 702 and entries in PIN entry interface element 704. For instance, when a user selects login button 712, login client 118 generates an encoded PIN and transmits the encoded PIN to authentication server 104, as described with respect to steps 216 and 218 of FIG. 2A. In accordance with an embodiment, login client 118 may verify the user has selected a key option of key selection interface element 702 and entered PIN elements in unmasked data entry areas of PIN entry interface element 704. In this context, if a key option is not selected and/or one or more unmasked data entry areas are empty, login client 118 may prompt the user to reattempt a login attempt. In this case, interface 700 may display an error message indicating if a key option was not selected and/or an unmasked data entry area was empty. If authentication server 104 authenticates the user, the user may be directed to an account webpage, allowed access to an application or other secured resource, or otherwise granted access to the account. If authentication server 104 does not authenticate the user, interface 700 may display an error message indicating the authentication decision of authentication 704. For instance, the error message may indicate that a selection and/or entry made by the user was incorrect (e.g., by displaying a prompt stating "The key selected or PIN elements entered are incorrect"), a number of login attempts the user is allowed, that the account is locked, and/or the like.

Figure 8:
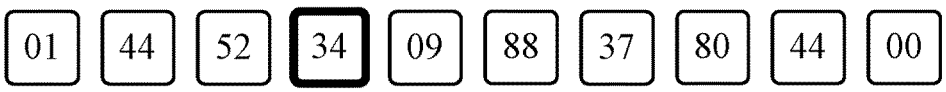
FIG. 8 depicts an example of encoded PIN generation based on user inputs to the secured login interface of FIG. 7.
Figure 8:
Figure 8:

Encoded PINs may be generated in various ways, in embodiments. For instance, FIG. 8 depicts an example of encoded PIN generation 800 based on user inputs to interface 700 of FIG. 7. Further structural and operational examples will be apparent to persons skilled in the relevant art(s) based on the following descriptions. Encoded PIN generation 800 is described as follows with respect to system 100 of FIG. 1, flowchart 200 of FIG. 2A, flowchart 220 of FIG. 2B, magic square tables 500B of FIG. 5B, and interface 700 of FIG. 7.

Encoded PIN generation 800 includes data table 802, key selection interface element 804, entered PIN elements 806, guide 808, and encoded PIN 810. Data table 802 may be used to understand information received by login client 118 of FIG. 1 for generating encoded PIN 810. For instance, data table 802 includes a hash index, a corresponding hash value, a masking scheme, a magic square table index, and a set of key options. In accordance with an embodiment, login client 118 receives the hash index, masking scheme, magic square table index, and set of key options from authentication server 104 as a character string. Login client 118 determines the corresponding hash value by mapping the received hash index to application hash table 122. As illustrated in FIG. 8, the hash index is equivalent to hash index 602 of FIG. 6A, the corresponding hash value is equivalent to hash value 604 of FIG. 6A, the masking scheme is representative of the masking scheme described with respect to FIG. 6B and FIG. 6C, and the set of key options are equivalent to the set of key options displayed in key selection interface element 702 of FIG. 7.

As illustrated in FIG. 8, key selection interface element 804 represents a user's selection of a key option presented in key selection interface element 702 of FIG. 7. The border of the key option labeled "34" is bolded to indicate the user has selected "34" in interface 700. Login client 118 of FIG. 1 is configured to identify a set of N integers that sum to the key option selected by the user, in this case "34". For instance, login client 118 may identify a particular magic square table from among application magic square tables 120 that corresponds to key option "34" and then apply the received magic square table index "0000001" in data table 802 to the determined magic square table. For instance, login client 118 may identify magic square table 508 of FIG. 5 from among application magic square tables 120 and apply magic square table index "0000001" to magic square table 508. In this context, the set of N integers are magic square values "01", "06", "11", and "16".

Entered PIN elements 806 represents a user's entries in PIN entry interface element 704 of FIG. 7. As illustrated in FIG. 8, the user entered the first, sixth, second and fifth elements of her user registered PIN—namely, "20", "AB", "20", and "01"—in the unmasked data entry areas of PIN entry interface element 704 labeled "1", "6", "2", and "5", respectively.

As illustrated in FIG. 8, encoded PIN 810 is "2001× 11AB1620×0601". Login client 118 is configured to generate encoded PIN 810 by combining the magic square values identified above, the subset of PIN elements entered by the user, and characters indicative of a mask, "×". Guide 808 may be used for understanding the order of the elements of encoded PIN 810. As illustrated in FIG. 8, guide 808 includes a set of boxes, where each box includes a character ordered according to the hash value of data table 802. Each box corresponds to an element of entered PIN elements 806. The type of character of each box and the masking scheme are used to determine which elements form the encoded PIN. For instance, as illustrated in FIG. 8, boxes containing a numeric character correspond to a PIN element of the user-registered PIN. PIN elements of the encoded PIN corresponding to boxes containing a numeric character are either PIN elements entered by a user or a "×" character indicative of a mask. Boxes containing an alphabetic character correspond to a magic square value. The PIN elements of the encoded PIN corresponding to a box containing an alphabetic character correspond to magic square values of the set of N integers. As illustrated in FIG. 8, the box labeled "A" corresponds to the first magic square value, the box labeled "B" corresponds to the second magic square value, the box labeled "C" corresponds to the third magic square value, and the box labeled "D" corresponds to the fourth magic square value. As illustrated in FIG. 8, each PIN element corresponding to a box containing an alphabetic character is matched to a magic square value, however, it is contemplated herein that some embodiments may replace the PIN elements corresponding to boxes corresponding to the second subset of masked data entry areas (e.g., the boxes labeled "C" and "B" as illustrated in FIG. 8) with a "×" character. For instance, in this context, encoded PIN 8 would be "2001××AB1620××01".

III. Example Authentication and Risk Score Determination Embodiments

As stated above, authentication server 104 of FIG. 1 is configured to make an authentication decision based at least on comparing the encoded PIN transmitted by login client 118 to an expected PIN. For instance, authenticator 138 of authentication manager 114 is configured in accordance with an embodiment to authenticate the user if the encoded PIN matches the expected PIN and not authenticate the user if the encoded PIN does not match the expected PIN. Some embodiments of authentication server 104 are configured to determine a risk score if the user is not authenticated. For instance, authentication server 104 includes a risk score determiner 140 configured to determine a risk score based on the comparison made by authenticator 138 and make a risk-based decision based on the risk score.

Figure 9:
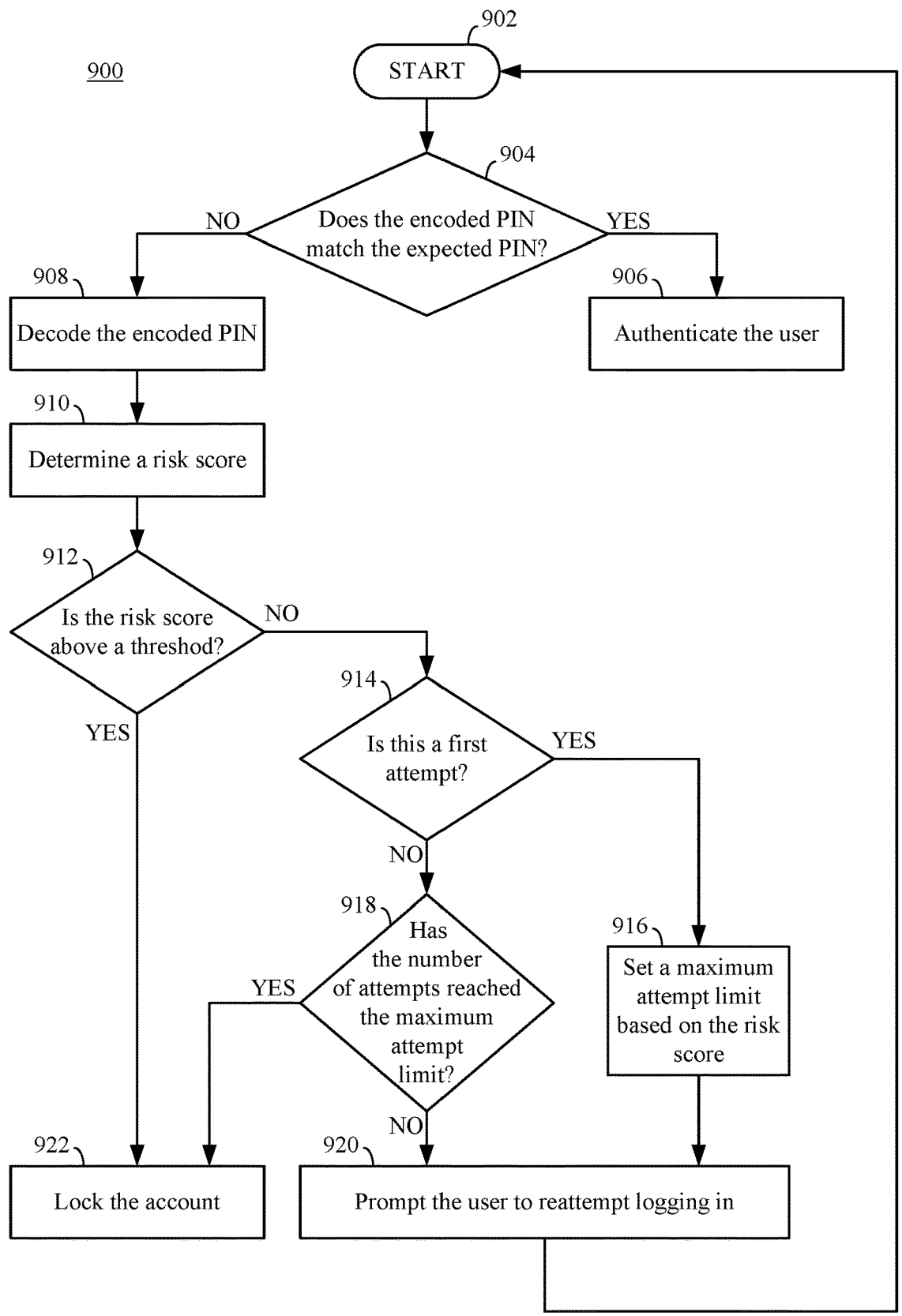
FIG. 9 is a flowchart of a process for authenticating a user and determining a risk score, according to an example embodiment.

Authentication decisions and risk scores may be determined may be made in various ways. For instance, FIG. 9 is a flowchart 900 of a process for authenticating a user and determining a risk score, according to an example embodiment. In an embodiment, authentication manager 114 may operate to perform one or all of the steps of flowchart 900. Flowchart 900 is described as follows with respect to system 100 of FIG. 1. Further structural and operational embodiments will be apparent to persons skilled in the relevant art(s) based on the following description. Note that not all steps of flowchart 900 need to be performed in all embodiments.

Flowchart 900 starts at step 902. In step 902, an encoded PIN and expected PIN are received. For instance, authenticator 138 of FIG. 1 is configured to receive an encoded PIN from login client 118 and an expected PIN from expected PIN generator 136.

In step 904, the encoded PIN is compared to the expected PIN. For instance, authenticator 138 of FIG. 1 is configured to compare the encoded PIN to the expected PIN. If the encoded PIN matches the expected PIN, flowchart 900 proceeds to step 906 where the user is authenticated. If the encoded PIN does not match the expected PIN, flowchart 900 proceeds to step 908.

In step 908, the encoded PIN is decoded. For instance, risk score determiner 140 of FIG. 1 is configured to decode the encoded PIN to generate decoded PIN information. The decoded PIN information includes magic square values identified by login client 118 (e.g., the set of N integers identified in step 208 of flowchart 200 of FIG. 2A) and the subset of PIN elements entered by the user (e.g., the subset of PIN elements received in step 214 of flowchart 200).

In step 910, a risk score is determined. For instance, risk score determiner 140 of FIG. 1 is configured to determine a risk score based on the decoded information generated in step 908. Risk scores may be determined in various ways. In accordance with an embodiment, risk score determiner 140 is configured to monitor every user attempt and behavior using a risk scoring model. The risk scoring model may be based on a supervised learning model, such as a fuzzy logic rule-based model. The risk scoring model may include a set of fuzzy rules from training input-output pairs.

In step 912, the risk score is measured against a threshold. For instance, risk score determiner 140 is configured to evaluate the risk score determined in step 910. If the risk score is above a threshold, the login attempt is considered a high risk level and flowchart 900 proceeds to step 922 where the account is locked. If the risk score is not above the threshold, flowchart 900 proceeds to step 914.

In step 914, the number of login attempts for the current login session are determined to check if this is the first login attempt. For instance, risk score determiner 140 of FIG. 1 evaluates how many times the user has attempted to log into the account within a set time period (e.g., one or more seconds, minutes, hours, days, weeks, and/or the like). The number of login attempts may refer to login attempts on a particular computing device, in a particular location, in a particular application, in a particular window or webpage, and/or the like. In accordance with an embodiment, the number of login attempts includes each login attempt across any computing device, location, application, window, webpage, and/or the like. If this is the first login attempt, flowchart 900 proceeds to step 916. If this is not the first login attempt, flowchart 900 proceeds to step 918.

In step 916, a maximum attempt limit is set based on the risk score. For instance, risk score determiner 140 of FIG. 1 sets a maximum attempt limit based on the risk score determined in step 910. In accordance with an embodiment, risk score determiner 140 sets the maximum attempt limit based on a set of risk thresholds. For instance, a lower risk score corresponds to more login attempts than a higher risk score. After the maximum attempt limit is set, flowchart 900 proceeds to step 920.

In step 918, a check is performed to determine if the number of attempts reached the maximum attempt limit set in step 916. For instance, risk score determiner 140 of FIG. 1 determines the number of attempts within the set time period and compares the number against the maxim attempt limit set in step 916. If the number of attempts reached the maximum attempt limit, flowchart 900 proceeds to step 922 where the account is locked. If the number of attempts is below the maximum attempt limit, flowchart 900 proceeds to step 920.

In step 920 the user is prompted to reattempt logging in. For instance, interface 700 of FIG. 7 may display a prompt requesting the user to reattempt logging in. The prompt may include an error message indicating that a selection and/or entry made by the user was incorrect (e.g., by displaying a prompt stating "The key selected or PIN elements entered are incorrect"), a number of login attempts the user is allowed, and/or the like. After prompting the user to reattempt logging in, flowchart 900 restarts to step 902.

As stated above, in step 922, the account is locked. Depending on the particular implementation, the user may unlock the account in various ways. For instance, the account may be locked for a specific period time. In accordance with an embodiment, a service administrator may unlock the account. In this case, the user may contact the service administrator and provide proof of identity to confirm that they are a legitimate user.

As stated above, risk score determiner 140 may determine risk scores based on a risk scoring model. The risk scoring model may be used to handle uncertainties and outliers in data. Various risk scoring models may be used in embodiments of risk score determiner 140. For instance, a risk scoring model may include a set of rules. The set of rules may be generated from training input-output pairs. For instance, input and output variables may be divided into several fuzzy subsets and assigned linguistic terms. The domains of input variables are divided into two regions and assigned linguistic terms "Low (0)" and "High (1)", respectively. The domain of the output variables are divided into two regions with linguistic terms "Low" and "High" assigned to them. A fuzzy membership function is consigned to each region. Different shapes of membership functions may be used. For instance, in the following example a triangular shape with a height of 1 at the center of the region and a 10% overlap between neighboring sets is used.

Various risk scoring rules may be generated, in embodiments. For example, FIG. 10 depicts an example set of rules 1000 that may be used to determine a risk score by an example embodiment. In an embodiment, risk score determiner 140 may operate to determine a risk score based on set of rules 1000. Further structural and operational embodiments will be apparent to persons skilled in the relevant art(s) based on the following description. Set of rules 1000 is described as follows with respect to system 100 of FIG. 1.

As illustrated in FIG. 10, set of rules 1000 includes eight rules labeled "Rule 1", "Rule 2", "Rule 3", "Rule 4", "Rule 5", "Rule 6", "Rule 7", and "Rule 8". Rules 1-4 represent scenarios where the key option selected by the user is valid and Rules 5-8 represent scenarios where the key option selected by the user is invalid. Each rule includes factors "Key Validity" and "PIN Validity" and outputs "Calculated Risk" and "Impact Factor". The factors determine how risk score determiner 140 of FIG. 1 evaluates an encoded PIN. Key Validity is based on the validity of the key selected by the user (i.e., whether the key selected by the user matches the key selected by key selector 130). PIN validity is based on the validity of the subset of PIN elements entered by the user. As illustrated in FIG. 10, PIN validity includes four columns indicating different amounts of valid PIN elements (25%, 50%, 75%, and 100%).

The Calculated Risk and Impact Factor outputs are determined by risk score determiner 140 of FIG. 1 based on the Key Validity and PIN Validity factors of the encoded PIN received from login client 118. Each level of Calculated Risk corresponds to a value of Impact Factor. As illustrated in FIG. 10, the Calculated Risk may be "Negligible/Low-Risk" with an Impact Factor value of 0, "Moderate Risk" with an Impact Factor value of 0.25, "High Risk" with an Impact Factor value of 0.5, "Very High Risk" with an Impact Factor of 0.75, or Extremely High Risk with an Impact Factor of 1. In accordance with an embodiment, Impact Factor is the risk score determined by risk score determiner 140. As described with respect to step 916 of flowchart 900 in FIG. 9, risk score determiner 140 may be configured to set a maximum attempt limit based on the risk score. In a non-limiting example, the maximum attempt limit is set to two if the Impact Factor is 0.75 or higher, set to three if the Impact Factor is 0.50 or higher but lower than 0.75, or set to four if the Impact Factor is below 0.50. However, maximum attempt limits may be set based on different ranges of the Impact Factor and/or may be set to any amount of attempts, depending on the particular implementation.

Thus, example rules have been described for a risk score determiner to determine a risk score based on an encoded PIN. While eight rules were shown in FIG. 10, it is contemplated herein that a risk score determiner may use any number of rules, including numbers less than ten, in the tens, in the hundreds, or in even greater numbers. Furthermore, while the PIN validity columns illustrated in FIG. 10 are set percentages, it is contemplated herein that one or more columns may represent ranges of percentages. For example, columns may be used to indicate if 0% to 24%, 25% to 49%, 50% to 74%, 75% to 99%, and 100% of the subset of PIN elements entered by a user are valid. In accordance with an embodiment, a flag is raised to a system administrator if the Impact Factor is above a threshold (e.g., 0.75 or higher).

IV. Further Example Embodiments and Advantages

As noted above, systems and devices, including login clients and authentication servers, may be configured in various ways for secure account login and/or authentication. User registration interfaces and secure login interfaces have been described with respect to virtual keyboards, however it is also contemplated herein that interfaces may use virtual keypads. Authentication and risk score determination have been described with respect to a key option selected by a user and subset of PIN elements entered by the user, however it is also contemplated herein that additional information may be used to authenticate a user and/or determine a risk score. For instance, the IP address and geolocation of the user may be used to determine if a user is authentic or to determine a risk score of the login attempt.

Embodiments of the present disclosure have been described for secure account login and/or authentication without requiring a two-step verification process (e.g., an authentication token generator, an e-mail address, a text message). However, it is contemplated herein that embodiments of the present disclosure may be used alongside a two-step verification process. For instance, a two-step verification process may be used to enter a one-time code or otherwise authenticate the user in addition to the secure account login and authentication processes described herein. Furthermore, it is contemplated herein that a two-step verification process may be integrated into the secure account login and authentication processes described herein. For instance, interface 700 may prompt the user to enter a one-time code presented on a mobile device registered to the user. In accordance with an embodiment, the one-time code entered by the user is included in the encoded PIN.

Moreover, according to the described embodiments and techniques, any components of registration clients, login clients, and/or authentication servers and their functions may be caused to be activated for operation/performance thereof based on other operations, functions, actions, and/or the like, including initialization, completion, and/or performance of the, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The further example embodiments and advantages described in this Section may be applicable to any embodiments disclosed in this Section or in any other Section of this disclosure.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

V. Example Computer System Implementations

Computing device 102, authentication server 104, network 106, application 108, identity manager 110, session manager 112, authentication manager 114, registration client 116, login client 118, application magic square tables 120, application hash table 122, PIN mapping table 124, server magic square tables 126, server hash table 128, key selector 130, index selector 132, mask generator 134, expected PIN generator 136, authenticator 138, risk score determiner 140, flowchart 200, flowchart 220, flowchart 230, user registration interface 300, identity manager 400, PIN mapping table 402, server magic square tables 404, server hash table 406, magic squares 500B, secured login interface 700, flowchart 900, and/or set of rules 1000 may be implemented in hardware, or hardware with any combination of software and/or firmware, including being implemented as computer program code configured to be executed in one or more processors and stored in a computer readable storage medium, or being implemented as hardware logic/electrical circuitry, such as being implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 11:
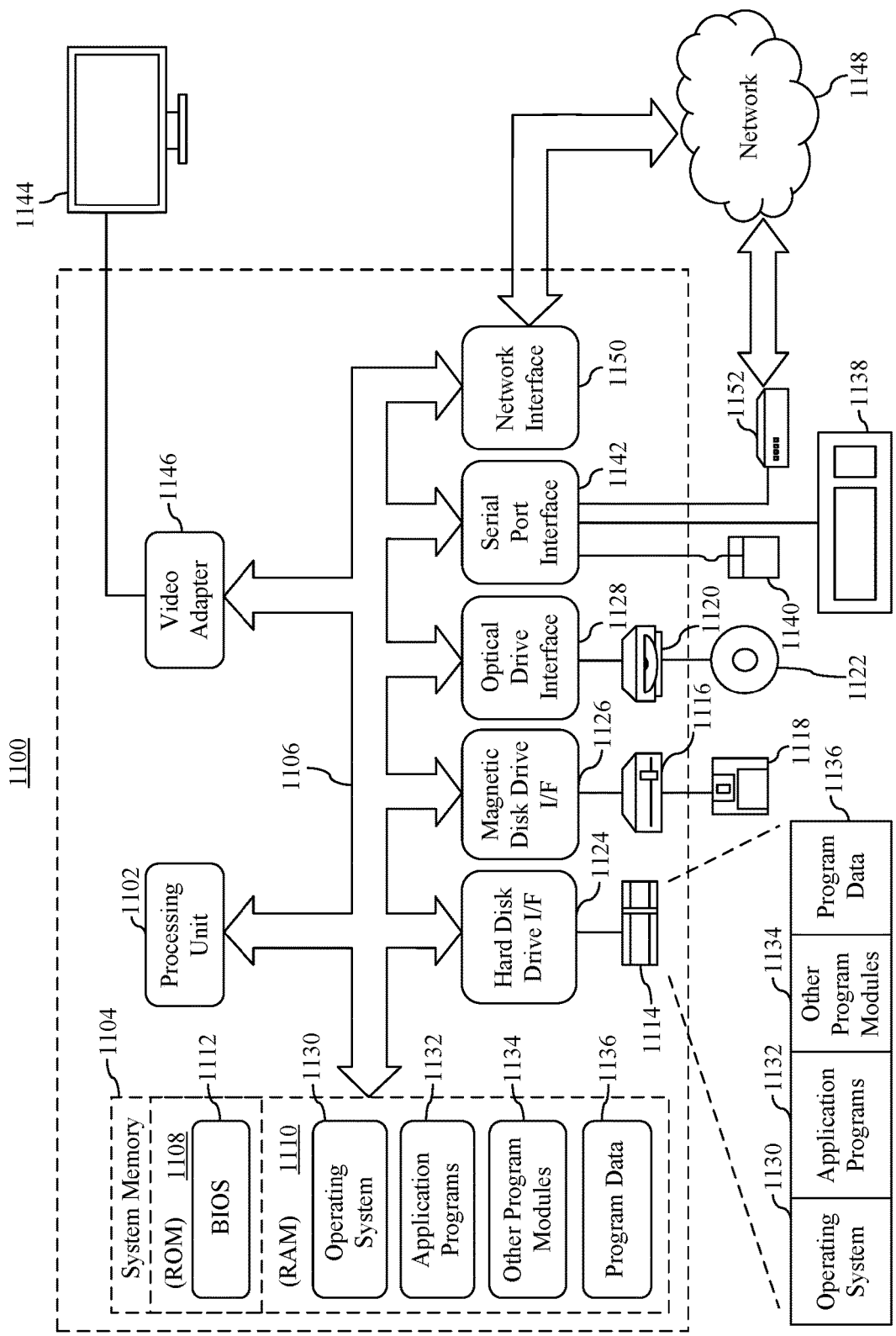
FIG. 11 is a block diagram of an example computer system that may be used to implement embodiments.

FIG. 11 depicts an exemplary implementation of a computer system 1100 ("system 1100" herein) in which embodiments may be implemented. For example, system 1100 may be used to implement computing device 102 and/or authentication server 104, as described above in reference to FIG.

1. System 1100 may also be used to user registration interface 300, as described above in reference to FIG. 3. System 1100 may also be used to implement identity manager 400, as described above in reference to FIG. 4. System 1100 may also be used to secure login interface 700, as described above in reference to FIG. 7. System 1100 may also be used to implement any of the steps of any of the flowcharts of FIG. 2A-2C and/or FIG. 9, as described above. System 1100 may also be used to implement any analyses, decodings, definitions, determinations, encodings, generations, identifications, mappings, storage, and/or the like associated with embodiments of FIGS. 5A-6, FIG. 8, and/or FIG. 10. The description of system 1100 provided herein is provided for purposes of illustration and is not intended to be limiting. Embodiments may be implemented in further types of computer systems, as would be known to persons skilled in the relevant art(s).

As shown in FIG. 11, system 1100 includes one or more processors, referred to as processor unit 1102, a system memory 1104, and a bus 1106 that couples various system components including system memory 1104 to processor unit 1102. Processor unit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor unit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random-access memory (RAM) 1110. A basic input/output system 1112 (BIOS) is stored in ROM 1108.

System 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards and drives (e.g., solid state drives (SSDs)), digital video disks, RAMs, ROMs, and other hardware storage media.

A number of program modules or components may be stored on the hard disk, magnetic disk, optical disk, ROM, or RAM. These program modules include an operating system 1130, one or more application programs 1132, other program modules 1134, and program data 1136. In accordance with various embodiments, the program modules may include computer program logic that is executable by processing unit 1102 to perform any or all the functions and features of computing device 102, authentication server 104, network 106, application 108, identity manager 110, session manager 112, authentication manager 114, registration client 116, login client 118, application magic square tables 120, application hash table 122, PIN mapping table 124, server magic square tables 126, server hash table 128, key selector 130, index selector 132, mask generator 134, expected PIN generator 136, authenticator 138, risk score determiner 140, flowchart 200, flowchart 220, flowchart 230, user registration interface 300, identity manager 400, PIN mapping table 402, server magic square tables 404, server hash table 406, magic squares 500B, secured login interface 700, flowchart 900, and/or set of rules 1000 (including any steps of flowcharts 200, 220, 230 and/or 900).

A user may enter commands and information into the system 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor unit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in, system 1100. For example, display screen 1144 may be a display screen of computing device 102 of FIG. 1 and/or the like. Display screen 1144 may display information, as well as being a user interface for receiving user commands and/or other information (e.g., by touch, finger gestures, virtual keyboard, etc.). For example, display screen 1144 may be configured to display user registration interface 300 of FIG. 3 and/or secure login interface 700 of FIG. 7. In addition to display screen 1144, system 1100 may include other peripheral output devices (not shown) such as speakers and printers.

System 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

As used herein, the terms "computer program medium," "computer-readable medium," and "computer-readable storage medium" are used to refer to physical hardware media such as the hard disk associated with hard disk drive 1114, removable magnetic disk 1118, removable optical disk 1122, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable system 1100 to implement features of embodiments described herein. Accordingly, such computer programs represent controllers of the system 1100.

Embodiments are also directed to computer program products comprising computer code or instructions stored on any computer-readable medium. Such computer program products include hard disk drives, optical disk drives, memory device packages, portable memory sticks, memory cards, and other types of physical storage hardware. In accordance with various embodiments, the program modules may include computer program logic that is executable by processing unit 1102 to perform any or all of the functions and features of computing device 102, authentication server 104, network 106, application 108, identity manager 110, session manager 112, authentication manager 114, registration client 116, login client 118, key selector 130, index selector 132, mask generator 134, expected PIN generator 136, authenticator 138, and/or risk score determiner 140 as described above in reference to FIG. 1, user registration interface 300 as described above in reference to FIG. 3, identity manager 400 as described above in reference to FIG. 4, and/or secured login interface 700 as described above in reference to FIG. 7. The program modules may also include computer program logic that, when executed by processing unit 1102, causes processing unit 1102 to perform any of the steps of any of the flowcharts of FIGS. 2A, 2B, 2C and/or 9, as described above. The program modules may also include computer program logic that, when executed by processing unit 1102, causes processing unit 1102 to perform any of the various analyses, decodings, definitions, determinations, encodings, generations, identifications, mappings, storage, and/or the like associated with embodiments of FIGS. 5A-6, FIG. 8, and/or FIG. 10, as described above.

VI. Additional Exemplary Embodiments

In an embodiment, a system comprises a login client. The login client is configured to receive a set of key options including a correct key option and information indicative of a hash value from an authentication server. The login client is further configured to prompt the user to select one of the set of key options. The login client is further configured to receive the key option selected by the user. The login client is further configured to identify a set of N integers that sum to the key option selected by the user. The login client is further configured to identify a subset of PIN elements of a user-registered PIN to be input by the user based on the hash value. The login client is further configured to prompt the user to enter the subset of PIN elements. The login client is further configured to receive the subset of PIN elements entered by the user. The login client is further configured to generate an encoded PIN by combining the set of N integers with the subset of PIN elements entered by the user in an order derived from the hash value. The login client is further configured to transmit the encoded PIN to the authentication server that is configured to make an authentication decision based at least on comparing the encoded PIN to an expected PIN.

In an embodiment, the correct key option is one of a user-registered key from a set of keys or a no key presented option.

In an embodiment, the system further comprises a registration client configured to register the set of keys and the user-registered PIN for the user by at least presenting a virtual keypad or keyboard with randomly-arranged keys via which the user can enter the PIN elements of the user-registered PIN.

In an embodiment, the information indicative of the hash value comprises a randomly-selected hash table index.

In an embodiment, the login client is configured to prompt the user to enter the subset of PIN elements by determining a masking scheme based on the hash value and presenting a PIN entry interface element. The PIN entry interface element includes a set of unmasked data entry areas and a set of masked data entry areas. Each unmasked data entry area of the set of unmasked data entry areas is adapted to receive and display user input of a particular PIN element of the subset of PIN elements. Each masked data entry area of the set of masked data entry areas is uneditable. The respective positions of each of the set of unmasked data entry areas and each of the set of masked data entry areas within the PIN entry interface element are determined based on the masking scheme.

In an embodiment, the set of masked data entry areas includes a first subset of the set of masked data entry areas and a second subset of the set of masked data entry areas. Each masked data entry area of the first subset resembles an unmasked data entry area with a masked input and is uneditable. Each masked data entry area of the second subset is uneditable.

In an embodiment, the login client is further configured to present a virtual keypad or keyboard with randomly-arranged keys via which the user can enter the subset of PIN elements.

In an embodiment, the login client is configured to identify the set of N integers that sum to the key option selected by the user by receiving a magic square table index from the authentication server and identifying the set of N integers that sum to the key option selected by the user by accessing a magic square table for the key option selected by the user using the magic square table index.

In an embodiment, the system further comprises the authentication server. The authentication server is configured to authenticate the user if the encoded PIN matches the expected PIN. The authentication server is further configured to determine a risk score if the user is not authenticated.

In an embodiment, the authentication server is configured to determine the risk score based on whether the set of N integers correspond to an expected set of N integers and an extent to which the subset of PIN elements entered by the user match registered values of the subset of PIN elements of the user-registered PIN. If the risk score is at or above a threshold, the authentication server prevents future login attempts. If the risk score is below the threshold, the authentication server permits an additional login attempt.

In an embodiment, the authentication server is further configured to limit the number of additional login attempts based on the risk score.

In an embodiment, a method is performed by a login client. The method includes receiving a set of key options including a correct key option and information indicative of a hash value from an authentication server. A user is prompted to select one of the set of key options. The key option selected by the user is received. A set of N integers that sum to the key option selected by the user is identified.

A subset of PIN elements of a user-registered PIN to be input by the user is identified based on the hash value. The user is prompted to enter the subset of PIN elements. The subset of PIN elements entered by the user are received. An encoded PIN is generated by combining the set of N integers with the subset of PIN elements entered by the user in an order derived from the hash value. The encoded PIN is transmitted to the authentication server that is configured to make an authentication decision based at least on comparing the encoded PIN to an expected PIN.

In an embodiment, the correct key option is one of: a user-registered key from a set of keys or a no key presented option.

In an embodiment, the information indicative of the hash value comprises a randomly-selected hash table index.

In an embodiment, said prompting the user to enter the subset of PIN elements includes determining a masking scheme based on the hash value and presenting a PIN entry interface element. The PIN entry interface element includes a set of unmasked data entry areas and a set of masked data entry areas. Each unmasked data entry area of the set of unmasked data entry areas is adapted to receive and display user input of a particular PIN element of the subset of PIN elements. Each masked data entry area of the set of masked data entry areas is uneditable. The respective positions of each of the set of unmasked data entry areas and each of the set of masked data entry areas within the PIN entry interface element are determined based on the masking scheme.

In an embodiment, the set of masked data entry areas includes a first subset of the set of masked data entry areas and a second subset of the set of masked data entry areas. Each masked data entry area of the first subset resembles an unmasked data entry area with a masked input and is uneditable. Each masked data entry area of the second subset is uneditable.

In an embodiment, said identifying the set of N integers that sum to the key option selected by the user includes receiving a magic square table index from the authentication server. The set of N integers that sum to the key option selected by the user are identified by accessing a magic square table for the key option selected by the user using the magic square table index.

In an embodiment, a computer-readable storage medium has programming instructions encoded thereon that are executable by one or more processors to perform a method. The method includes receiving a set of key options including a correct key option and information indicative of a hash value from an authentication server. A user is prompted to select one of the set of key options. The key option selected by the user is received. A set of N integers that sum to the key option selected by the user is identified. A subset of PIN elements of a user-registered PIN to be input by the user is identified based on the hash value. The user is prompted to enter the subset of PIN elements. The subset of PIN elements entered by the user are received. An encoded PIN is generated by combining the set of N integers with the subset of PIN elements entered by the user in an order derived from the hash value. The encoded PIN is transmitted to the authentication server that is configured to make an authentication decision based at least on comparing the encoded PIN to an expected PIN.

In an embodiment, said prompting the user to enter the subset of PIN elements includes determining a masking scheme based on the hash value and presenting a PIN entry interface element. The PIN entry interface element includes a set of unmasked data entry areas and a set of masked data entry areas. Each unmasked data entry area of the set of unmasked data entry areas is adapted to receive and display user input of a particular PIN element of the subset of PIN elements. Each masked data entry area of the set of masked data entry areas is uneditable. The respective positions of each of the set of unmasked data entry areas and each of the set of masked data entry areas within the PIN entry interface element are determined based on the masking scheme.

In an embodiment, said identifying the set of N integers that sum to the key option selected by the user includes receiving a magic square table index from the authentication server. The set of N integers that sum to the key option selected by the user are identified by accessing a magic square table for the key option selected by the user using the magic square table index.

VII. CONCLUSION

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A system comprising:
a login client configured to:
receive from an authentication server:
a set of key options including a correct key option; and
information indicative of a hash value;
prompt a user to select one of the set of key options;
receive the key option selected by the user;
identify a set of N integers that sum to the key option selected by the user;
identify a subset of PIN elements of a user-registered PIN to be input by the user based on the hash value;
prompt the user to enter the subset of PIN elements;
receive the subset of PIN elements entered by the user;
generate an encoded PIN by combining the set of N integers with the subset of PIN elements entered by the user in an order derived from the hash value; and
transmit the encoded PIN to the authentication server that is configured to make an authentication decision based at least on comparing the encoded PIN to an expected PIN.

2. The system of claim 1, wherein the correct key option is one of:
a user-registered key from a set of keys; or
a no key presented option.

3. The system of claim 2, further comprising a registration client configured to register the set of keys and the user-registered PIN for the user by at least presenting a virtual keypad or keyboard with randomly-arranged keys via which the user can enter the PIN elements of the user-registered PIN.

4. The system of claim 1, wherein the information indicative of the hash value comprises a randomly-selected hash table index.

5. The system of claim 1, wherein the login client is configured to prompt the user to enter the subset of PIN elements by:
determining a masking scheme based on the hash value; and presenting a PIN entry interface element that includes:
a set of unmasked data entry areas, each unmasked data entry area of the set of unmasked data entry areas being adapted to receive and display user input of a particular PIN element of the subset of PIN elements; and
a set of masked data entry areas, each masked data entry area of the set of masked data entry areas being uneditable;
wherein the respective positions of each of the set of unmasked data entry areas and each of the set of masked data entry areas within the PIN entry interface element are determined based on the masking scheme.

6. The system of claim 5, wherein the set of masked data entry areas includes:
a first subset of the set of masked data entry areas, each masked data entry area of the first subset resembling an unmasked data entry area with a masked input and being uneditable; and
a second subset of the set of masked data entry areas, each masked data entry area of the second subset being uneditable.

7. The system of claim 1, wherein the login client is further configured to present a virtual keypad or keyboard with randomly-arranged keys via which the user can enter the subset of PIN elements.

8. The system of claim 1, wherein the login client is configured to identify the set of N integers that sum to the key option selected by the user by:
receiving a magic square table index from the authentication server; and
identifying the set of N integers that sum to the key option selected by the user by accessing a magic square table for the key option selected by the user using the magic square table index.

9. The system of claim 1, further comprising the authentication server, wherein the authentication server is configured to:
authenticate the user if the encoded PIN matches the expected PIN; and
determine a risk score if the user is not authenticated.

10. The system of claim 9, wherein the authentication server is configured to determine the risk score based on whether the set of N integers correspond to an expected set of N integers and an extent to which the subset of PIN elements entered by the user match registered values of the subset of PIN elements of the user-registered PIN, and:
if the risk score is at or above a threshold, prevent future login attempts; and
if the risk score is below the threshold, permit an additional login attempt.

11. The system of claim 10, wherein the authentication server is further configured to limit the number of additional login attempts based on the risk score.

12. A method performed by a login client, comprising:
receiving from an authentication server:
a set of key options including a correct key option; and
information indicative of a hash value;
prompting a user to select one of the set of key options;
receiving the key option selected by the user;
identifying a set of N integers that sum to the key option selected by the user;
identifying a subset of PIN elements of a user-registered PIN to be input by the user based on the hash value;
prompting the user to enter the subset of PIN elements;
receiving the subset of PIN elements entered by the user;
generating an encoded PIN by combining the set of N integers with the subset of PIN elements entered by the user in an order derived from the hash value; and
transmitting the encoded PIN to the authentication server that is configured to make an authentication decision based at least on comparing the encoded PIN to an expected PIN.

13. The method of claim 12, wherein the correct key option is one of:
a user-registered key from a set of keys; or
a no key presented option.

14. The method of claim 12, wherein the information indicative of the hash value comprises a randomly-selected hash table index.

15. The method of claim 12, wherein said prompting the user to enter the subset of PIN elements comprises:
determining a masking scheme based on the hash value; and
presenting a PIN entry interface element that includes:
a set of unmasked data entry areas, each unmasked data entry area of the set of unmasked data entry areas being adapted to receive and display user input of a particular PIN element of the subset of PIN elements; and
a set of masked data entry areas, each masked data entry area of the set of masked data entry areas being uneditable;
wherein the respective positions of each of the set of unmasked data entry areas and each of the set of masked data entry areas within the PIN entry interface element are determined based on the masking scheme.

16. The method of claim 15, wherein the set of masked data entry areas includes:
a first subset of the set of masked data entry areas, each masked data entry area of the first subset resembling an unmasked data entry area with a masked input and being uneditable; and
a second subset of the set of masked data entry areas, each masked data entry area of the second subset being uneditable.

17. The method of claim 12, wherein said identifying the set of N integers that sum to the key option selected by the user comprises:
receiving a magic square table index from the authentication server; and
identifying the set of N integers that sum to the key option selected by the user by accessing a magic square table for the key option selected by the user using the magic square table index.

18. A computer-readable storage medium having programming instructions encoded thereon that are executable by one or more processors to perform a method, the method comprising:
receiving from an authentication server:
a set of key options including a correct key option; and
information indicative of a hash value;
prompting a user to select one of the set of key options;
receiving the key option selected by the user;
identifying a set of N integers that sum to the key option selected by the user;
identifying a subset of PIN elements of a user-registered PIN to be input by the user based on the hash value; and
prompting the user to enter the subset of PIN elements;
receiving the subset of PIN elements entered by the user;

generating an encoded PIN by combining the set of N integers with the subset of PIN elements entered by the user in an order derived from the hash value; and transmitting the encoded PIN to the authentication server that is configured to make an authentication decision based at least on comparing the encoded PIN to an expected PIN.

19. The computer-readable storage medium of claim 18, wherein said prompting the user to enter the subset of PIN elements comprises:

determining a masking scheme based on the hash value; and presenting a PIN entry interface element that includes:
- a set of unmasked data entry areas, each unmasked data entry area of the set of unmasked data entry areas being adapted to receive and display user input of a particular PIN element of the subset of PIN elements; and
- a set of masked data entry areas, each masked data entry area of the set of masked data entry areas being uneditable;

wherein the respective positions of each of the set of unmasked data entry areas and each of the set of masked data entry areas within the PIN entry interface element are determined based on the masking scheme.

20. The computer-readable storage medium of claim 18, wherein said identifying the set of N integers that sum to the key option selected by the user comprises:

receiving a magic square table index from the authentication server; and identifying the set of N integers that sum to the key option selected by the user by accessing a magic square table for the key option selected by the user using the magic square table index.

* * * * *